(12) United States Patent
Liu et al.

(10) Patent No.: US 9,857,022 B2
(45) Date of Patent: Jan. 2, 2018

(54) ELECTRONIC DEVICE AND STAND THEREOF

(71) Applicant: WISTRON CORP., New Taipei (TW)

(72) Inventors: Yuju Liu, New Taipei (TW); I-Chun Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 177 days.

(21) Appl. No.: 14/836,913

(22) Filed: Aug. 26, 2015

(65) Prior Publication Data

US 2016/0088749 A1 Mar. 24, 2016

(30) Foreign Application Priority Data

Sep. 19, 2014 (TW) .............................. 103132454 A

(51) Int. Cl.
*G06F 1/16* (2006.01)
*F16M 11/38* (2006.01)
(Continued)

(52) U.S. Cl.
CPC ............. *F16M 11/38* (2013.01); *F16M 11/10* (2013.01); *F16M 13/00* (2013.01); *F16M 13/022* (2013.01); *F16M 13/04* (2013.01); *E05D 11/06* (2013.01); *E05Y 2900/606* (2013.01); *F16M 2200/041* (2013.01)

(58) Field of Classification Search
None
See application file for complete search history.

(56) References Cited

U.S. PATENT DOCUMENTS 5,445,266 A * 8/1995 Prete ................... A45C 7/0086
190/102
5,555,614 A * 9/1996 Book ....................... A45C 9/00
29/401.1
(Continued)

FOREIGN PATENT DOCUMENTS

| CN | 201359666 Y | 12/2009 |
| TW | M492379 U | 12/2014 |
| WO | 2012096471 A2 | 7/2012 |

OTHER PUBLICATIONS

TW Office Action dated Aug. 24, 2015 in Taiwanese application No. 10421129480.

*Primary Examiner* — Courtney Smith
*Assistant Examiner* — Rashen E Morrison
(74) *Attorney, Agent, or Firm* — Maschoff Brennan

(57) ABSTRACT

An electronic device includes a display, at least one hinge assembly and a supporting assembly. The display has a rear surface. The hinge assembly includes a fixing component and at least one assembling component. The fixing component is disposed on the display. The at least one assembling component is pivoted on the fixing component. The supporting assembly is disposed on the assembling component for pivoting relative to the display. The supporting assembly includes a holder and a support that are for moving with each other. The holder is for pivoting relative to the display to have a holding position and a leaning position. The support is for pivoting relative to the display to have a storing position and a supporting position. The holder pivots from the holding position to the leaning position to drive the support to pivot with the holder from the storing position to the supporting position.

21 Claims, 22 Drawing Sheets

(51) Int. Cl.
*F16M 11/10* (2006.01)
*F16M 13/00* (2006.01)
*F16M 13/02* (2006.01)
*F16M 13/04* (2006.01)
*E05D 11/06* (2006.01)

(56) References Cited

U.S. PATENT DOCUMENTS

| | | | | |
|---|---|---|---|---|
| 6,266,241 B1* | 7/2001 | Van Brocklin | ....... | G06F 1/1616 361/679.46 |
| 6,899,311 B1* | 5/2005 | Ternus | ............ | F16M 11/10 248/454 |
| 6,976,799 B2* | 12/2005 | Kim | ............ | G06F 1/1618 361/679.09 |
| 7,148,874 B2* | 12/2006 | Anzai | ............ | F16M 11/10 345/156 |
| 7,281,698 B2* | 10/2007 | Patterson, Jr. | ......... | A45C 11/00 206/756 |
| 7,540,466 B2* | 6/2009 | Yang | ............ | F16M 11/10 248/126 |
| 7,735,644 B2* | 6/2010 | Sirichai | ............ | A45F 5/02 206/320 |
| 8,328,008 B2* | 12/2012 | Diebel | ............ | A45C 11/00 206/305 |
| 8,382,059 B2* | 2/2013 | Le Gette | ............ | F16M 11/04 248/163.1 |
| 8,400,767 B2* | 3/2013 | Yeom | ............ | F16M 11/10 248/917 |
| 8,607,976 B2* | 12/2013 | Wu | ............ | G06F 1/1626 206/320 |
| 8,684,174 B2* | 4/2014 | Sirichai | ............ | A45F 5/02 206/320 |
| 8,693,192 B2* | 4/2014 | Hsieh | ............ | H04M 1/04 248/460 |
| 8,720,843 B1* | 5/2014 | Chen | ............ | G06F 1/1613 206/305 |
| 8,746,449 B2* | 6/2014 | Gallagher | ............ | F16M 11/105 206/320 |
| 8,763,795 B1* | 7/2014 | Oten | ............ | A45C 11/00 206/320 |
| 8,800,763 B2* | 8/2014 | Hale | ............ | F16M 11/041 206/320 |
| 8,888,063 B2* | 11/2014 | Mack | ............ | F16M 11/00 248/121 |
| 8,922,995 B2* | 12/2014 | Su | ............ | F16M 11/10 248/917 |
| 8,925,722 B2* | 1/2015 | Poon | ............ | F16M 13/00 206/320 |
| 8,941,988 B2* | 1/2015 | Ariga | ............ | G06F 1/1626 361/679.02 |
| 8,985,543 B2* | 3/2015 | Chen | ............ | A45C 11/00 206/45.24 |
| 8,997,983 B2* | 4/2015 | Sajid | ............ | G06F 1/1628 206/320 |
| 9,013,863 B2* | 4/2015 | Hsu | ............ | H05K 7/1401 206/320 |
| 9,195,263 B2* | 11/2015 | Mack | ............ | F16M 11/00 |
| 9,201,466 B2* | 12/2015 | Lai | ............ | G06F 1/162 |
| 9,372,507 B2* | 6/2016 | Dekock | ............ | G06F 1/166 |
| 9,377,810 B2* | 6/2016 | Hishinuma | ............ | G06F 1/1613 |
| 9,404,298 B1* | 8/2016 | Chen | ............ | G06F 1/1681 |
| 9,451,822 B2* | 9/2016 | Gu | ............ | A47B 23/044 |
| 9,518,414 B1* | 12/2016 | Chen | ............ | G06F 1/1681 |
| 2004/0114315 A1* | 6/2004 | Anlauff | ............ | G06F 1/162 361/679.28 |
| 2005/0269479 A1* | 12/2005 | Yeh | ............ | F16M 13/00 248/457 |
| 2008/0024436 A1* | 1/2008 | Morooka | ............ | G06F 1/1613 345/156 |
| 2008/0035808 A1* | 2/2008 | Rawlings | ............ | F16M 11/041 248/176.1 |
| 2010/0012812 A1* | 1/2010 | Hu | ............ | G06F 1/1601 248/454 |
| 2010/0122924 A1* | 5/2010 | Andrews | ............ | A45C 9/00 206/320 |
| 2010/0232861 A1* | 9/2010 | Shibata | ............ | G06F 1/1662 400/491 |
| 2011/0147398 A1* | 6/2011 | Ahee | ............ | G06F 1/1626 220/810 |
| 2011/0216064 A1* | 9/2011 | Dahl | ............ | G06F 1/1616 345/428 |
| 2011/0290687 A1* | 12/2011 | Han | ............ | A45C 3/02 206/320 |
| 2011/0297564 A1* | 12/2011 | Kim | ............ | A45C 11/00 206/320 |
| 2012/0037523 A1* | 2/2012 | Diebel | ............ | A45C 11/00 206/320 |
| 2012/0140410 A1* | 6/2012 | Chen | ............ | G06F 1/1624 361/679.55 |
| 2012/0199501 A1* | 8/2012 | Le Gette | ............ | F16M 11/04 206/45.24 |
| 2012/0217174 A1* | 8/2012 | Ting | ............ | G06F 1/1628 206/45.2 |
| 2012/0261304 A1* | 10/2012 | Busri | ............ | A45C 11/00 206/736 |
| 2012/0327580 A1* | 12/2012 | Gengler | ............ | G06F 1/1626 361/679.09 |
| 2013/0088431 A1* | 4/2013 | Ballagas | ............ | G06F 1/1626 345/168 |
| 2013/0098782 A1* | 4/2013 | Diebel | ............ | A45C 11/00 206/45.25 |
| 2013/0099636 A1* | 4/2013 | Igarashi | ............ | H05K 5/03 312/223.1 |
| 2013/0134061 A1* | 5/2013 | Wu | ............ | G06F 1/1626 206/320 |
| 2013/0163197 A1* | 6/2013 | Mack | ............ | F16M 11/00 361/679.56 |
| 2013/0213838 A1* | 8/2013 | Tsai | ............ | G06F 1/1633 206/320 |
| 2013/0214661 A1* | 8/2013 | McBroom | ............ | G06F 1/1667 312/325 |
| 2013/0279096 A1* | 10/2013 | Gengler | ............ | H05K 7/00 361/679.01 |
| 2013/0319897 A1* | 12/2013 | Hsu | ............ | A45C 11/00 206/472 |
| 2014/0043121 A1* | 2/2014 | Sartee | ............ | G06F 1/16 335/219 |
| 2014/0098026 A1* | 4/2014 | Lin | ............ | G06F 3/0208 345/169 |
| 2014/0151248 A1* | 6/2014 | Hurst | ............ | A45C 13/1069 206/45.23 |
| 2014/0191973 A1* | 7/2014 | Zellers | ............ | G06F 3/0414 345/168 |
| 2014/0205799 A1* | 7/2014 | Lin | ............ | B29C 65/08 428/138 |
| 2014/0216971 A1* | 8/2014 | Ashley | ............ | A45C 11/00 206/472 |
| 2014/0224676 A1* | 8/2014 | Ashley | ............ | A45C 11/00 206/37 |
| 2014/0262854 A1* | 9/2014 | Chen | ............ | A45C 11/00 206/45.24 |
| 2014/0262933 A1* | 9/2014 | Lockwood | ............ | A45C 11/00 206/762 |
| 2014/0306553 A1* | 10/2014 | Lee | ............ | G06F 1/3231 307/326 |
| 2014/0347814 A1* | 11/2014 | Zaloom | ............ | G06F 1/1626 361/679.56 |
| 2015/0005034 A1* | 1/2015 | Agnes Desodt | ..... | H04B 1/3888 455/566 |
| 2015/0282354 A1* | 10/2015 | Spollen | ............ | A45C 11/00 206/45.2 |
| 2016/0097227 A1* | 4/2016 | Hsu | ............ | G06F 1/16 16/354 |

* cited by examiner

ELECTRONIC DEVICE AND STAND THEREOF

This non-provisional application claims priority under 35 U.S.C. §119(a) on Patent Application No(s). 103132454 filed in Taiwan, R.O.C. on Sep. 19, 2014, the entire contents of which are hereby incorporated by reference.

BACKGROUND

Technical Field

The disclosure relates to an electronic device and a stand thereof, more particularly to a stand having a holder and a support that are for moving with each other.

Background

Mobile electronic devices, such as tablets and smart phones are generally used by people in their daily lives. To watch videos, look at images, or use programs with the mobile electronic device more comfortably, manufacturers have installed a support on the backside or bottom of the electronic device so that the electronic device is able to stand supported on a table.

However, a user needs to move the support with his/her hands from a storing position where the support leans against the electronic device. When the user needs to stand the electronic device on the table, one of the two hands of the user holds the main body of the electronic device, and the other hand moves the support to change its position. It is inconvenient to stand the electronic device on the table. Therefore, it is important to improve the support installed on the mobile electronic device so that the user is able to easily and conveniently stand the electronic device on the table.

SUMMARY

According to one aspect of the present disclosure, an electronic device comprises a display, at least one hinge assembly and a supporting assembly. The display has a rear surface. The at least one hinge assembly comprises a fixing component and at least one assembling component. The fixing component is disposed on the display, and the at least one assembling component is pivoted on the fixing component. The supporting assembly is disposed on the assembling component for pivoting relative to the display. The supporting assembly comprises a holder and a support that are for moving with each other. The holder is for pivoting relative to the display to have a holding position and a leaning position. The support is for pivoting relative to the display to have a storing position and a supporting position. The holder is for pivoting from the holding position to the leaning position so as to drive the support to pivot with the holder from the storing position to the supporting position. The rear surface of the display and the holder keep a first angle when the holder is located at the holding position. The holder leans against the rear surface when the holder is located at the leaning position. The support leans against the rear surface when the support is located at the storing position. The rear surface and the support keep a second angle when the support is located at the supporting position.

According to one another aspect of the present disclosure, a stand comprises a supporting assembly and a hinge assembly. The supporting assembly comprises a holder and a support that are for moving with each other. The hinge assembly comprises a pivotal shaft, a fixing component, a first assembling component, a second assembling component, a link-up component, a fastening component, a first elastic component and a second elastic component. The pivotal shaft comprises a first pivotal section, a second pivotal section and a limiting section. The first pivotal section and the second pivotal section are connected to two surfaces of the limiting section that are opposite to each other, respectively. The fixing component is securely fixed to the first pivotal section for being assembled to an electronic device, and the electronic device comprises a display. The first assembling component is pivoted on the second pivotal section, and the first assembling component is assembled to the holder. The second assembling component is pivoted on the second pivotal section, and the second assembling component is assembled to the support. The link-up component is pivoted on the second pivotal section, and the link-up component is located between the first assembling component and the second assembling component. The fastening component is fastened to the second pivotal section, and the second assembling component is located between the fastening component and the link-up component. The first elastic component surrounds the first pivotal section. Two ends of the first elastic component that are opposite to each other are fastened to the fixing component and the first assembling component, respectively. The second elastic component surrounds the second pivotal section. Two ends of the second elastic component opposite to each other are fastened to the fastening component and the second assembling component, respectively.

According to still another aspect of the present disclosure, a stand comprises a supporting assembly and a hinge assembly. The supporting assembly comprises a holder and a support that for moving relative to each other. The hinge assembly comprises a fixing component and at least one assembling component. The fixing component is for assembling to an electronic device, and the electronic device comprises a display. The at least one assembling component is pivoted on the fixing component for being assembled to the holder or the support.

BRIEF DESCRIPTION OF THE DRAWINGS

The present disclosure will become more fully understood from the detailed description given herein below, along with the accompanying drawings which are for illustration only, thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
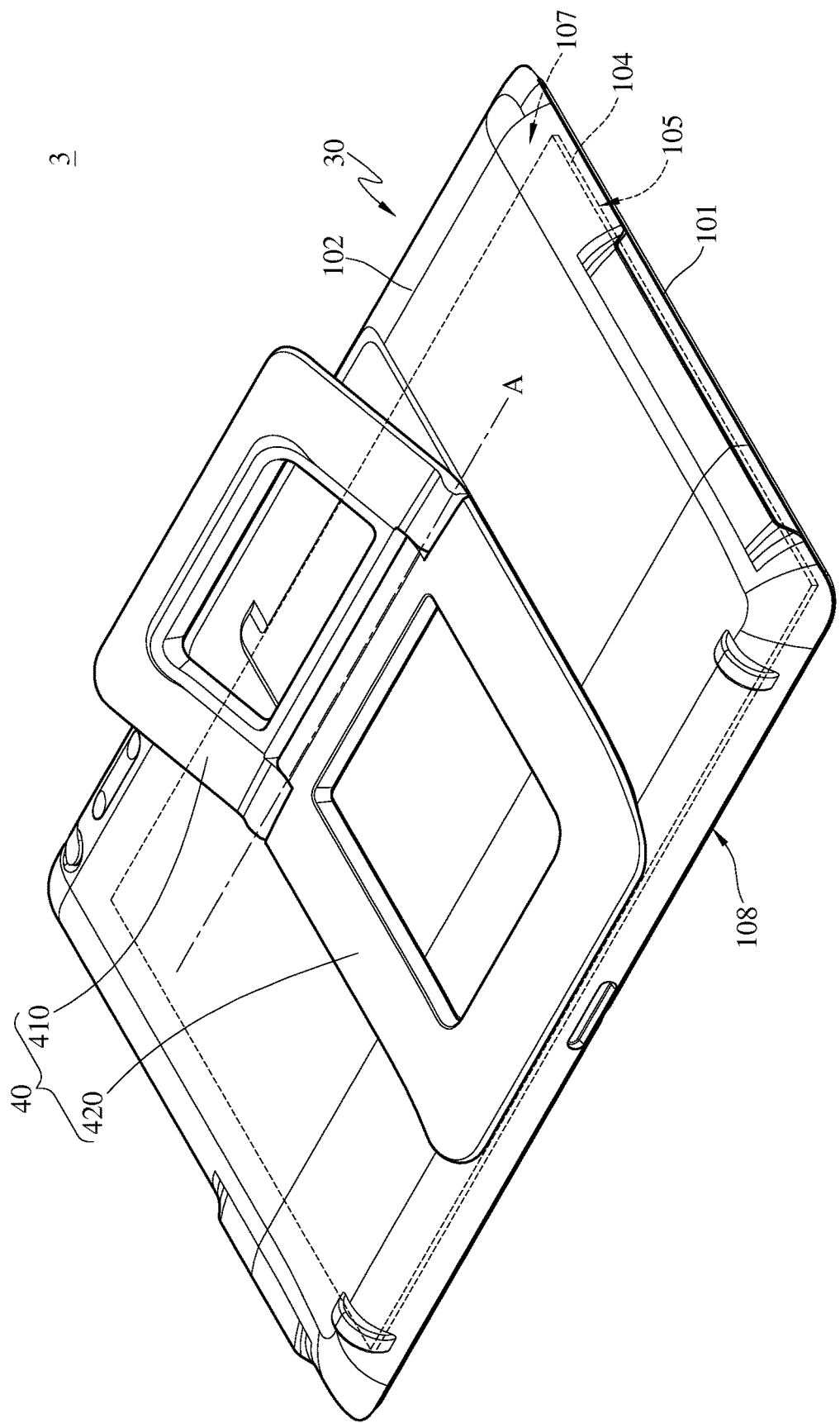
FIG. 1 is a perspective view of an electronic device according to a first embodiment of the disclosure.
Figure 2:
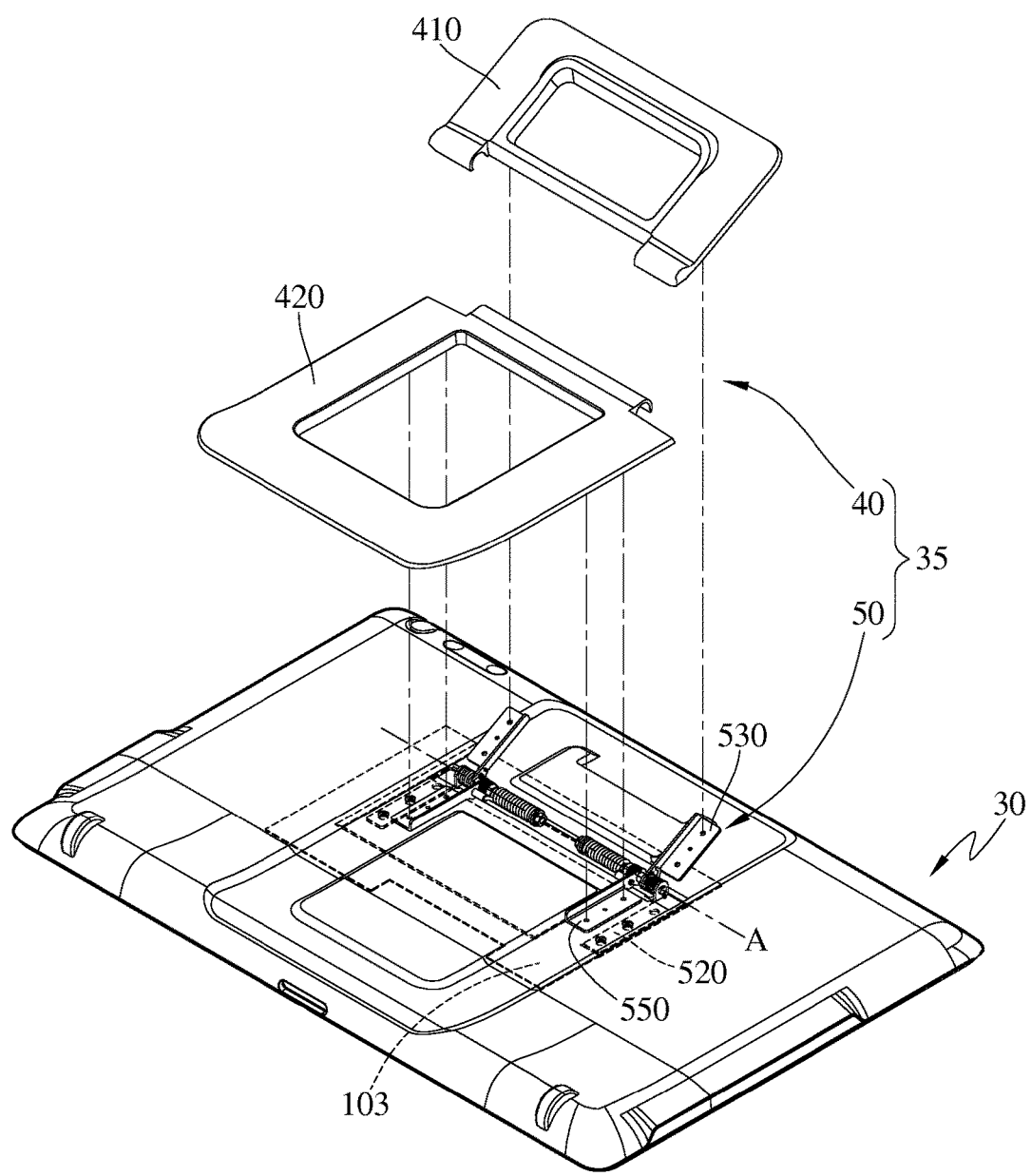
FIG. 2 is an exploded view of the electronic device according to the first embodiment of the disclosure.
Figure 3A:
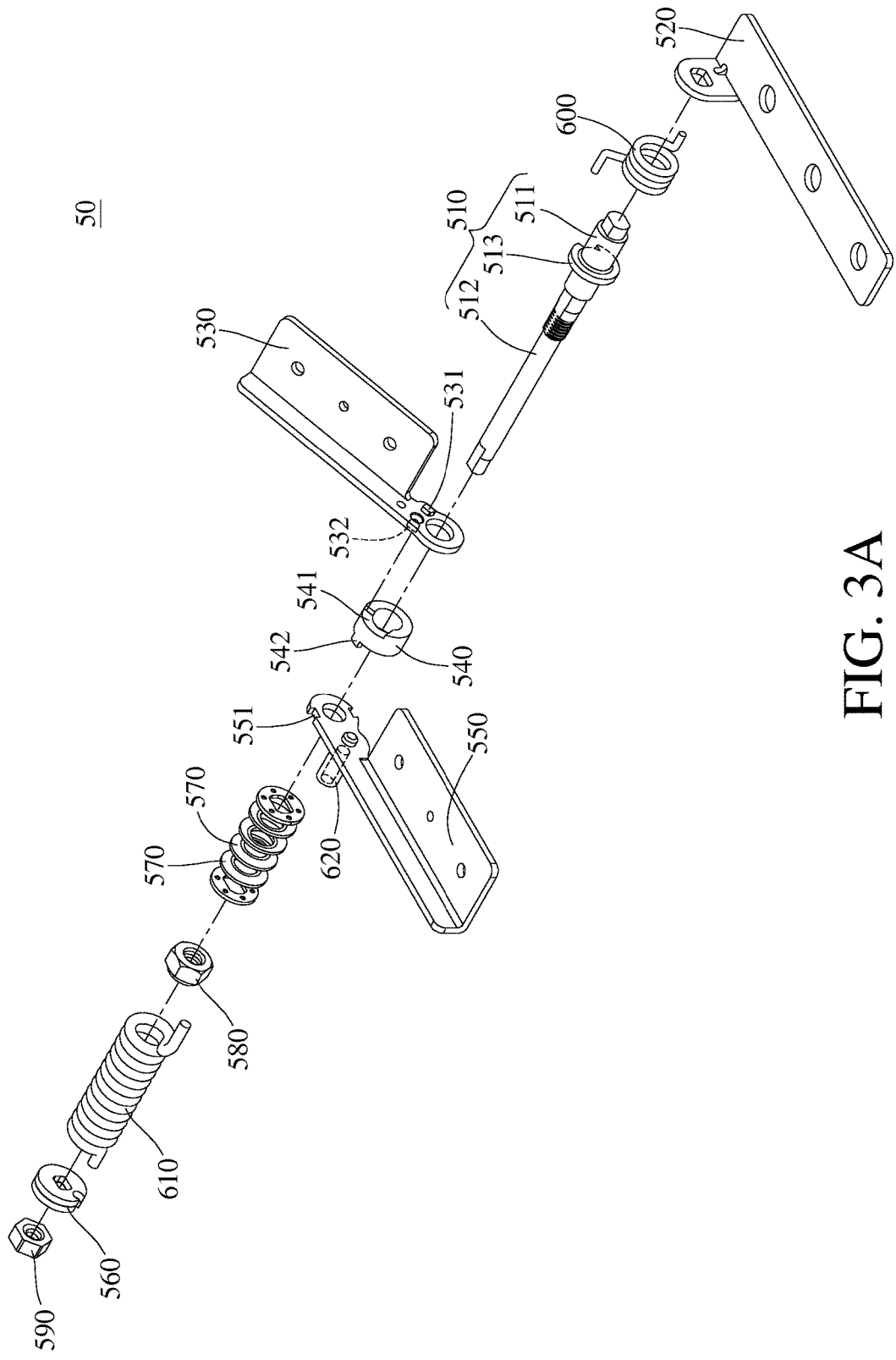
FIG. 3A is an exploded view of a hinge assembly of the electronic device according to the first embodiment of the disclosure.
Figure 3B:
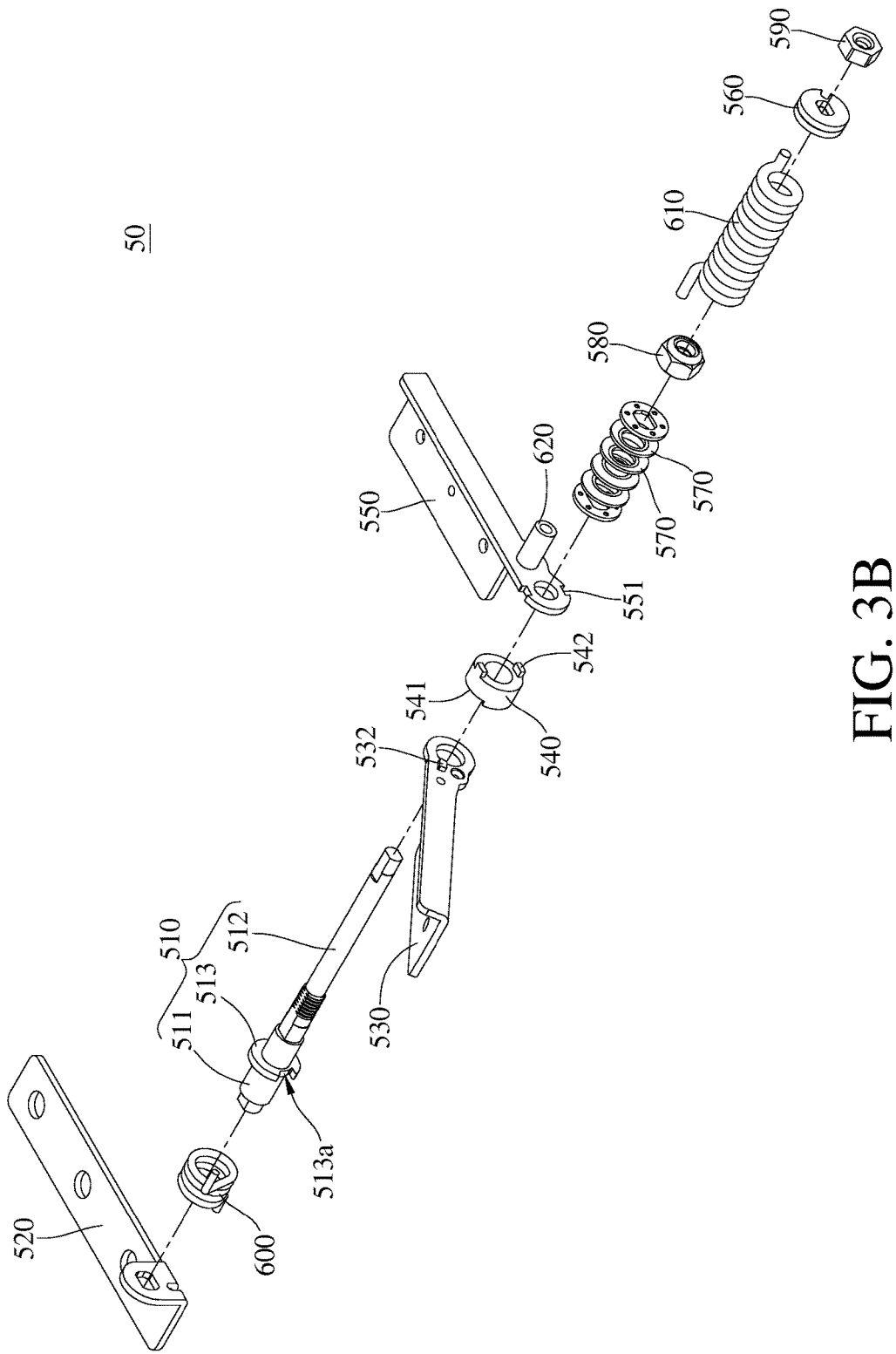
FIG. 3B is another exploded view of the hinge assembly from a different perspective in FIG. 3A.

Please refer to FIG. 1, FIG. 2, FIG. 3A and FIG. 3B. FIG. 1 is a perspective view of an electronic device according to a first embodiment of the disclosure. FIG. 2 is an exploded view of the electronic device according to the first embodiment of the disclosure. FIG. 3A is an exploded view of a hinge assembly of the electronic device according to the first embodiment of the disclosure. FIG. 3B is another exploded view of the hinge assembly from a different perspective in FIG. 3A. In this embodiment, an electronic device 3 comprises a display 30 and a stand 35. The electronic device 3 is, for example, a tablet, a smart phone, a digital camera or a video recorder.

The display 30 comprises a first case 101, a second case 102, an assembling plate 103 and a screen 104. The screen 104 has a displaying surface 105, and the second case 102 has a rear surface 106. The first case 101 is installed on the second case 102 to form an accommodation space 107 together. The screen 104 is located inside the accommodation space 107, and the displaying surface 105 is exposed from the first case 101 to the outside. The rear surface 106 is located at a side of the second case 102 facing away from the first case 101. In other words, the displaying surface 105 and the rear surface 106 are located at two sides of the display 30 that are opposite to each other, respectively. The assembling plate 103 is located in the accommodation space 107, and is fixed to the first case 101.

The stand 35 comprises a supporting assembly 40 and a hinge assembly 50. The supporting assembly 40 comprises a holder 410 and a support 420 that are two individual units. The hinge assembly 50 comprises a pivotal shaft 510, a fixing component 520, a first assembling component 530, a link-up component 540, a second assembling component 550, a fastening component 560, a first elastic component 600 and a second elastic component 610. The hinge assembly 50 further comprises a plurality of elastic rings 570, a first locking component 580, a second locking component 590 and a reinforcement sleeve 620.

The pivotal shaft 510 comprises a first pivotal section 511, a second pivotal section 512 and a limiting section 513. The first pivotal section 511 and the second pivotal section 512 are connected to two sides of the limiting section 513 that are opposite to each other, respectively. In this embodiment, the limiting section 513 is a circular plate with its diameter being greater than the diameters of the first pivotal section 511 and the second pivotal section 512. The first pivotal section 511 and the second pivotal section 512 are coaxial. The limiting section 513 has a first limiting notch 513a.

Two different parts of the fixing component 520 are securely fixed to the first pivotal section 511 of the pivotal shaft 510 and the assembling plate 103 of the display 30, respectively, so as to fix the pivotal shaft 510 to the display 30.

The first assembling component 530, the link-up component 540 and the second assembling component 550 are all pivoted on the second pivotal section 512. The link-up component 540 is located between the first assembling component 530 and the second assembling component 550. The first assembling component 530 is assembled to the holder 410. The second assembling component 550 is assembled to the support 420. In this embodiment, two sides of the first assembling component 530 that are opposite to each other comprise a first protrusion 531 and a second protrusion 532, respectively. The first protrusion 531 is slidably disposed in the first limiting notch 513a. The link-up component 540 has a second limiting notch 541, and the second protrusion 532 is slidably disposed in the second limiting notch 541. Therefore, the holder 410 is for pivoting relative to the display 30 to drive the first assembling component 530 to rotate relative to the pivotal shaft 510. When the first assembling component 530 pivots relative to the pivotal shaft 510, the second protrusion 532 of the first assembling component 530 presses an end of the second limiting notch 541 so as to drive the link-up component 540 to rotate relative to the pivotal shaft 510 with the first assembling component 530.

Moreover, the link-up component 540 comprises a hook 542, and the second assembling 550 has a slot 551. The hook 542 is fastened to the slot 551 so that the link-up component 540 is for driving the second assembling component 550 to move with each other. That is, when the first assembling component 530 drives the link-up component 540 to rotate along a direction, the link-up component 540 drives the second assembling component 550 to rotate with the link-up component 540 along the same direction.

The elastic rings 570 surround (i.e., sleeve) the second pivotal section 512. The first locking component 580 is screwed to the second pivotal section 512 so as to interpose the first assembling component 530, the link-up component 540, the second assembling component 550 and the elastic rings 570 between the limiting section 513 and the first locking component 580. The first locking component 580 is for being screwed tightly or loosely so as to adjust a torque for driving the second assembling component 550 to rotate. For example, when the stand 35 supports a heavier display 30, the first locking component 580 can be screwed tightly so as to prevent the second assembling component 550 and support 420 fixed together from rotating due to the weight of the display 30.

The fastening component 560 is securely fastened to the second pivotal section 512, and the second assembling component 550 is located between the fastening component 560 and the link-up component 540.

The first elastic component 600 is, for example, a torsion spring. The first elastic component 600 surrounds the first pivotal section 511. Two ends of the first elastic component 600 that are opposite to each other are fastened to the fixing component 520 and the first assembling component 550, respectively.

The second elastic component 610 is, for example, a torsion spring. The second elastic component 610 surrounds the second pivotal section 512. Two ends of the second elastic component 610 that are opposite to each other are fastened to the fastening component 550 and the second assembling component 560, respectively.

The second locking component 590 is screwed to the second pivoting part 512 so as to interpose the second elastic component 610 and the fastening component 560 between the first locking component 580 and the second locking component 590.

The reinforcement sleeve 620 is riveted to the second assembling component 550. An end of the second elastic component 610 is embedded in the reinforcement sleeve 620 so as to be fixed to the second assembling component 550. A depth of an axial pore of the reinforcement sleeve 620 is much greater than the thickness of the second assembling component 550 so that the second elastic component 610 is fixed to the second assembling component 550 tightly. Therefore, it is favorable for preventing the second elastic component 610 from separating from the second assembling component 550 due to the excess torque applied on the second elastic component 610.

Figure 4A:
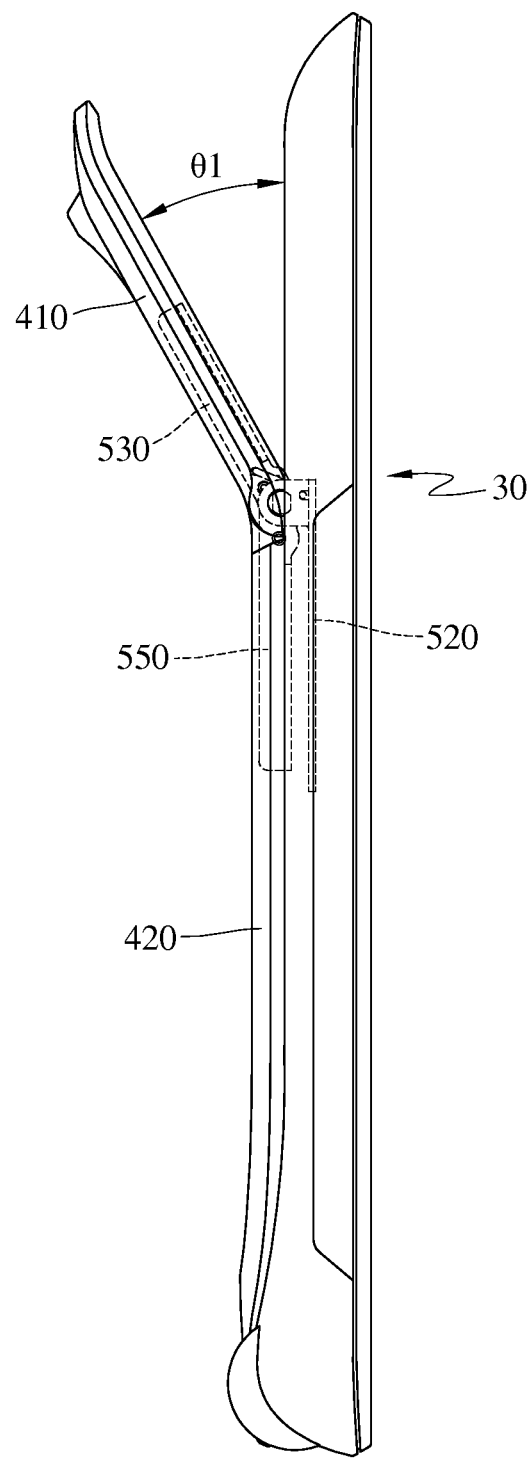
FIG. 4A is a side view of the electronic device with a holder located at a holding position according to the first embodiment of the disclosure.
Figure 5A:
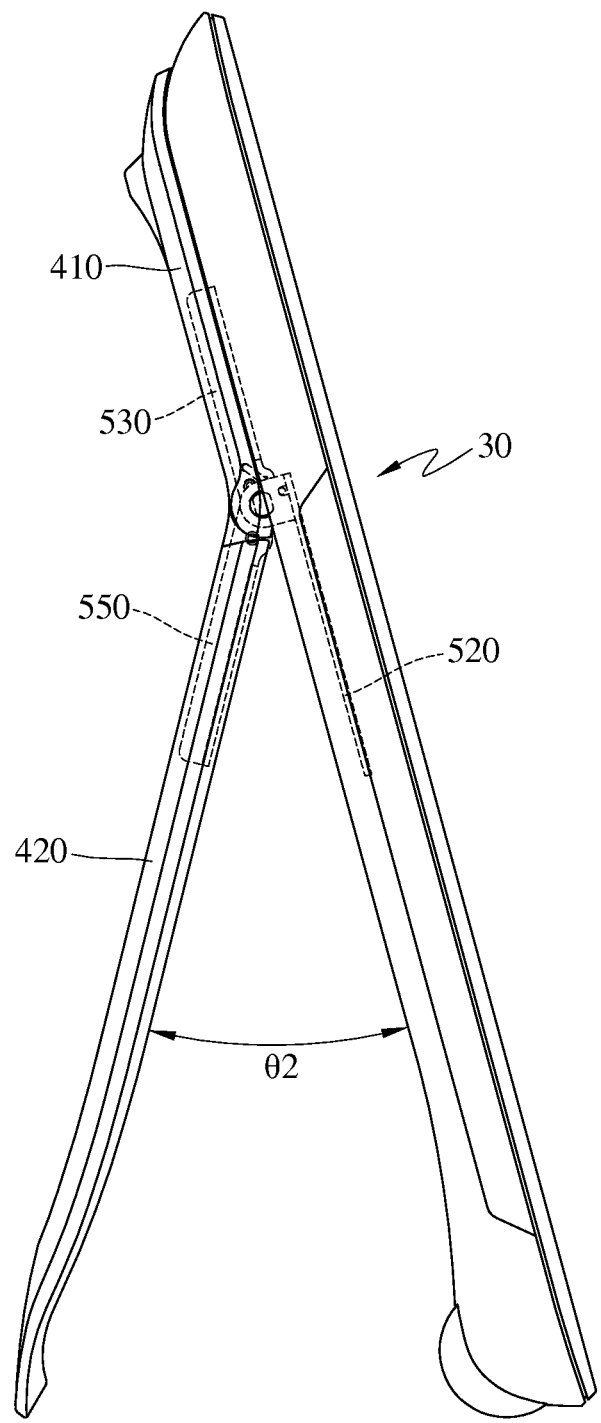
FIG. 5A is a side view of the electronic device with a support located at a supporting position according to the first embodiment of the disclosure.

The holder 410 is for pivoting relative to the display 30 via the hinge assembly 50 to have a holding position (as shown in FIG. 4A) and a leaning position (as shown in FIG. 5A), and the support 420 is for pivoting relative to the display 30 to have a storing position (as shown in FIG. 4A) and a supporting position (as shown in FIG. 5A). The rear surface 106 and the holder 410 keep a first angle θ1 therebetween when the holder 410 is located at the holding position. The holder 410 leans against the rear surface 106 when located at the leaning position. When the holder 410 pivots from the holding position to the leaning position, the holder 410 drives the support 420 to pivot with each other so that the support 420 pivots from the storing position to the supporting position. The support 420 leans against the rear surface 106 when located at the storing position. The rear surface 106 and the support 420 keep a second angle θ2 therebetween when the support 420 is located at the supporting position.

To favorably operate the electronic device 3, the torques for driving the first elastic component 600 and the second elastic component 610 can be designed based on the weight of the display 30. For example, in this embodiment, the display 30 is 3 kilograms (kg). The torque for driving the first elastic component 600 to rotate is 4 kg, and the first elastic component 600 normally drives the holder 410 to locate at the leaning position. The torque for driving the second elastic component 610 to rotate is 7 kg, and the second elastic component 610 normally drives the support 420 to locate and position at the storing position. The torque for driving the second elastic component 610 is greater than the torque for driving the first elastic component 600 so that a resultant moment of the two torques forces the holder 410 to locate and position at the holding position. Furthermore, when the support 420 pivots from the storing position to the supporting position, the torque for driving the second elastic component 610 increases from 7 kg to 31 kg, and therefore it is favorable for supporting the display 30 steadily.

Figure 4B:
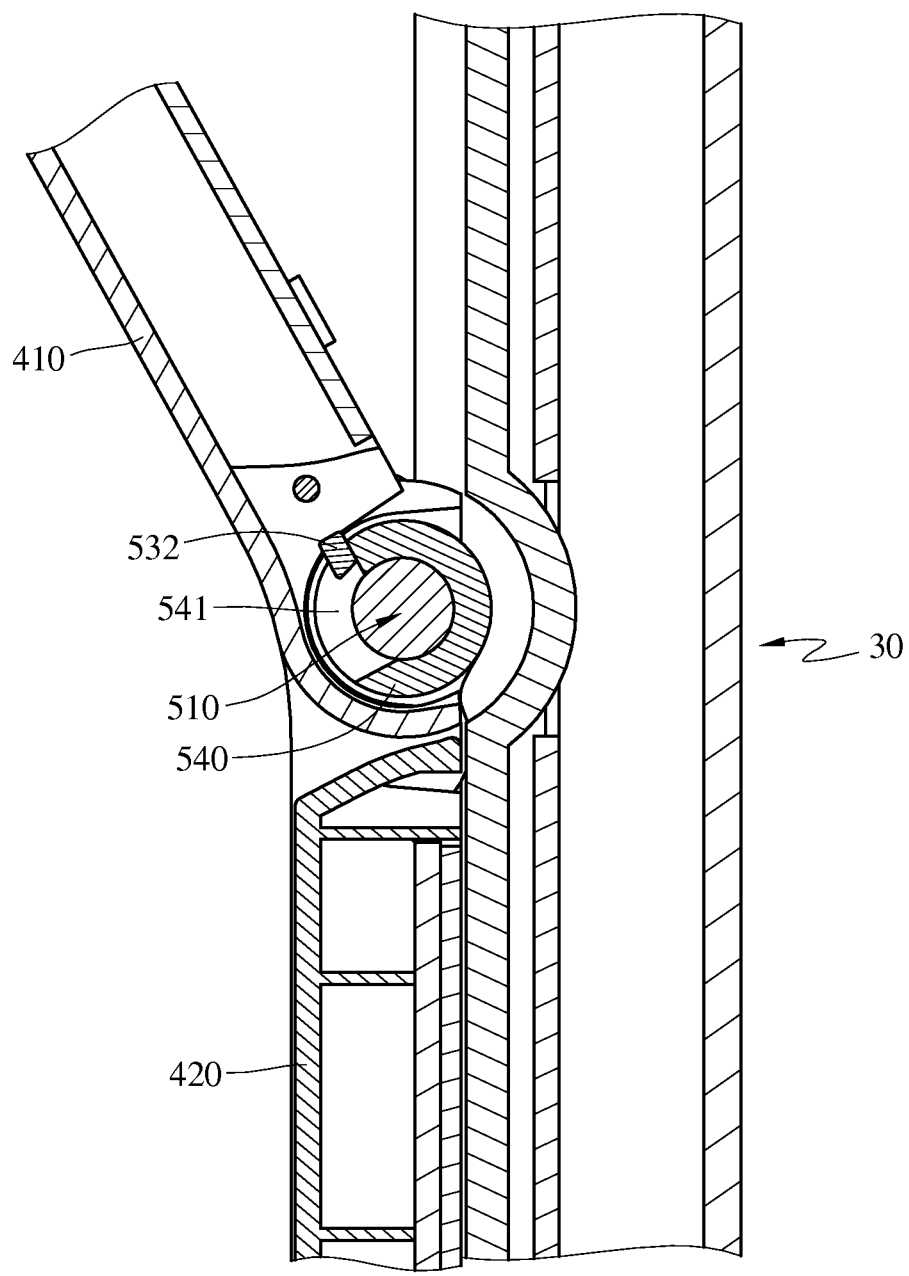
FIG. 4B is an enlarged cross-sectional view of the electronic device in FIG. 4A.
Figure 5B:
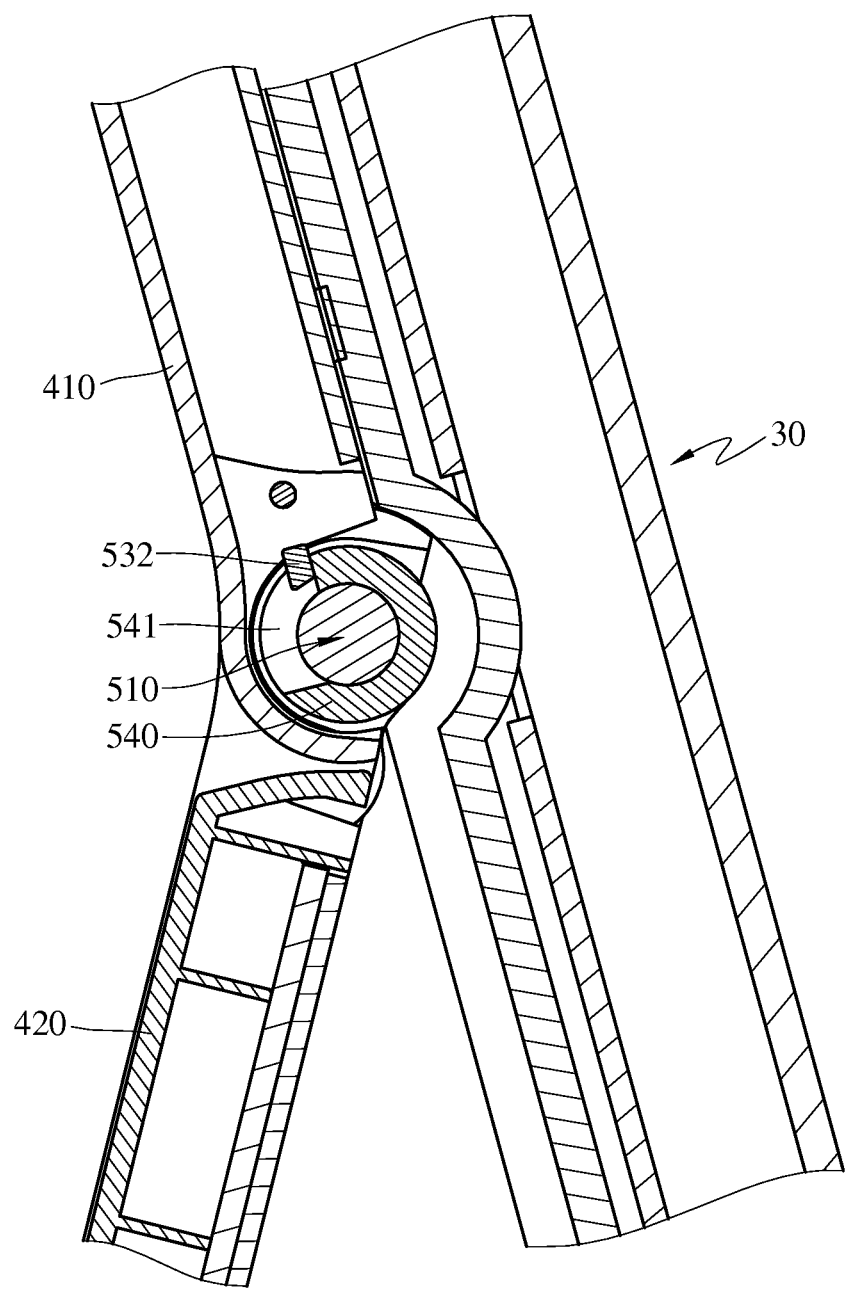
FIG. 5B is an enlarged cross-sectional view of the electronic device in FIG. 5A.
Figure 6A:
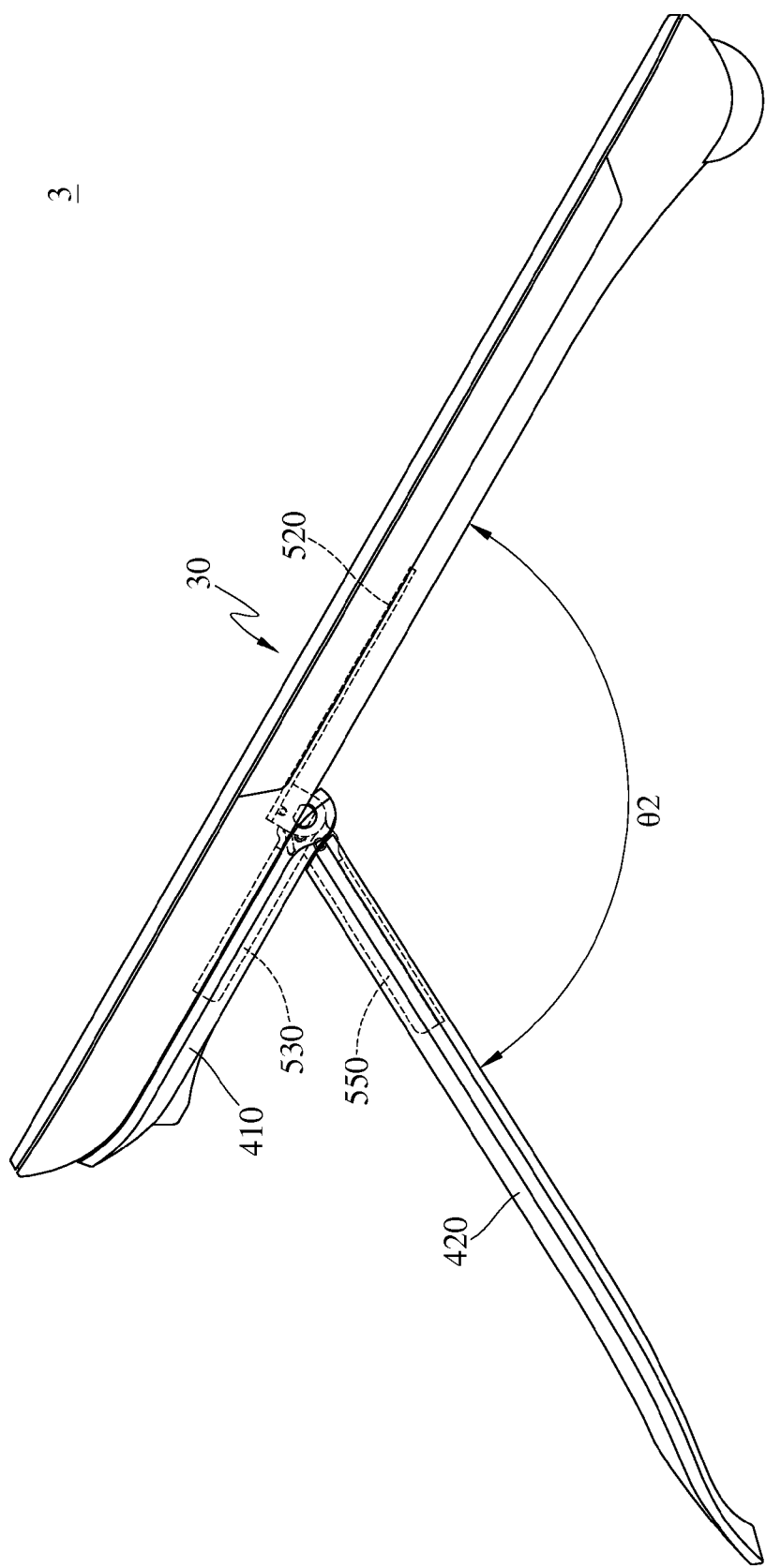
FIG. 6A is a side view of the electronic device being pressed in FIG. 5A.
Figure 6B:
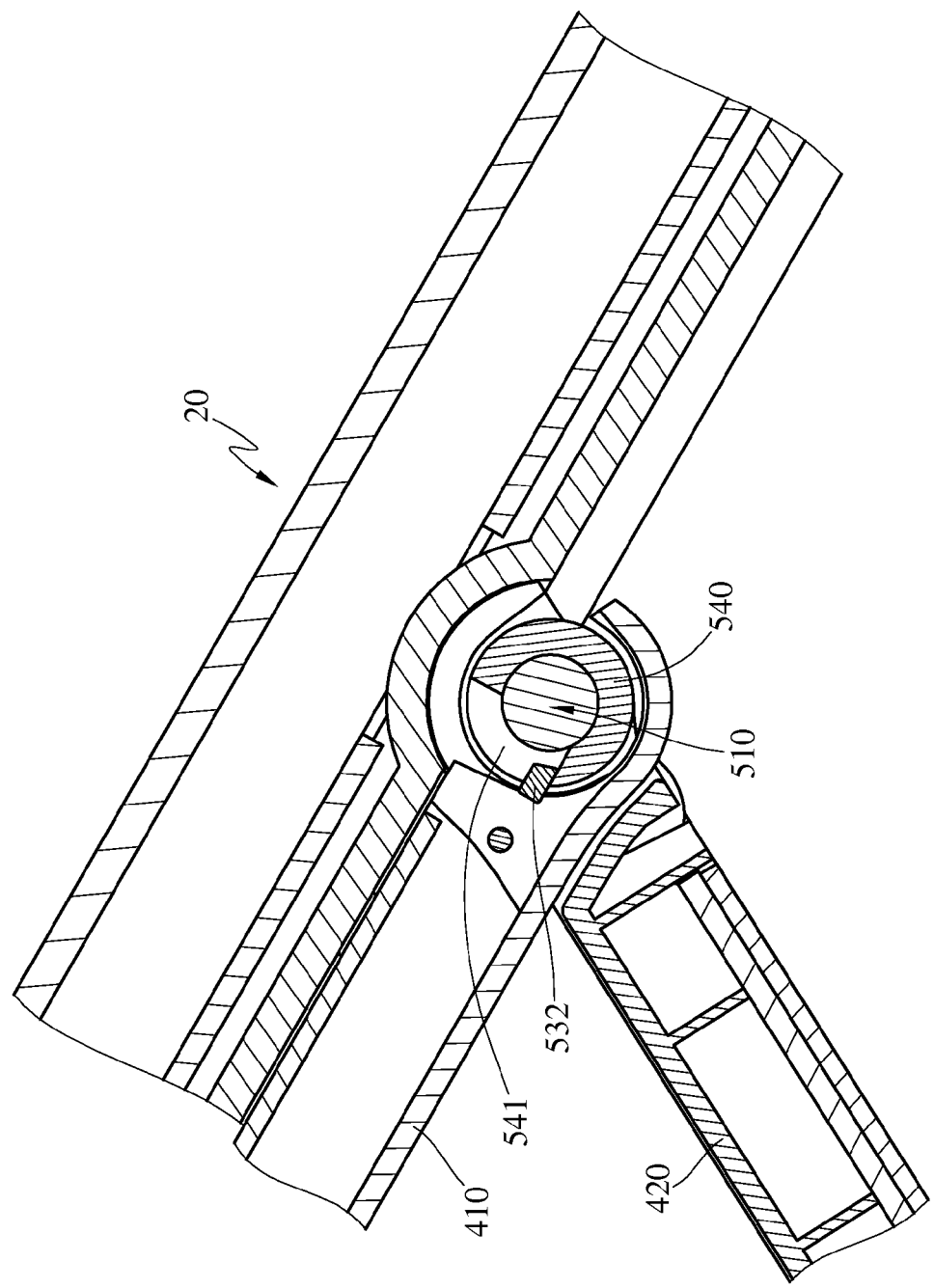
FIG. 6B is an enlarged cross-sectional view of the electronic device in FIG. 6A.

Please refer to FIG. 4A, FIG. 4B, FIG. 5A, FIG. 5B, FIG. 6A and FIG. 6B. FIG. 4A is a side view of the electronic device with a holder located at a holding position according to the first embodiment of the disclosure. FIG. 4B is an enlarged cross-sectional view of the electronic device in FIG. 4A. FIG. 5A is a side view of the electronic device with a support located at a supporting position according to the first embodiment of the disclosure. FIG. 5B is an enlarged cross-sectional view of the electronic device in FIG. 5A. FIG. 6A is a side view of the electronic device being pressed in FIG. 5A. FIG. 6B is an enlarged cross-sectional view of the electronic device in FIG. 6A. The holder 410 is located at the holding position, and the support 420 is located at the storing position via the resultant moment of the two torques aforementioned (as shown in FIG. 4A and FIG. 4B).

When a user presses the holder 410 so as to drive the holder 410 to pivot relative to the display 30 from the holding position to the leaning position, the second protrusion 532 of the first assembling component 530 presses the second limiting notch 541 of the link-up component 540. Therefore, the first assembling component 530 drives the link-up component 540 to rotate relative to the pivotal shaft 510, and the link-up component 540 drives the second assembling component 550 and the support 420 fixed together to pivot from the storing position to the supporting position (as shown in FIG. 5A and FIG. 5B).

When the user needs to adjust the angle between the rear surface 106 of the display 30 and the support 420, the user can press the display 30 to increase the second angle θ2 so as to gradually decrease an angle of slope (a degree of inclination) of the display 30.

Figure 7:
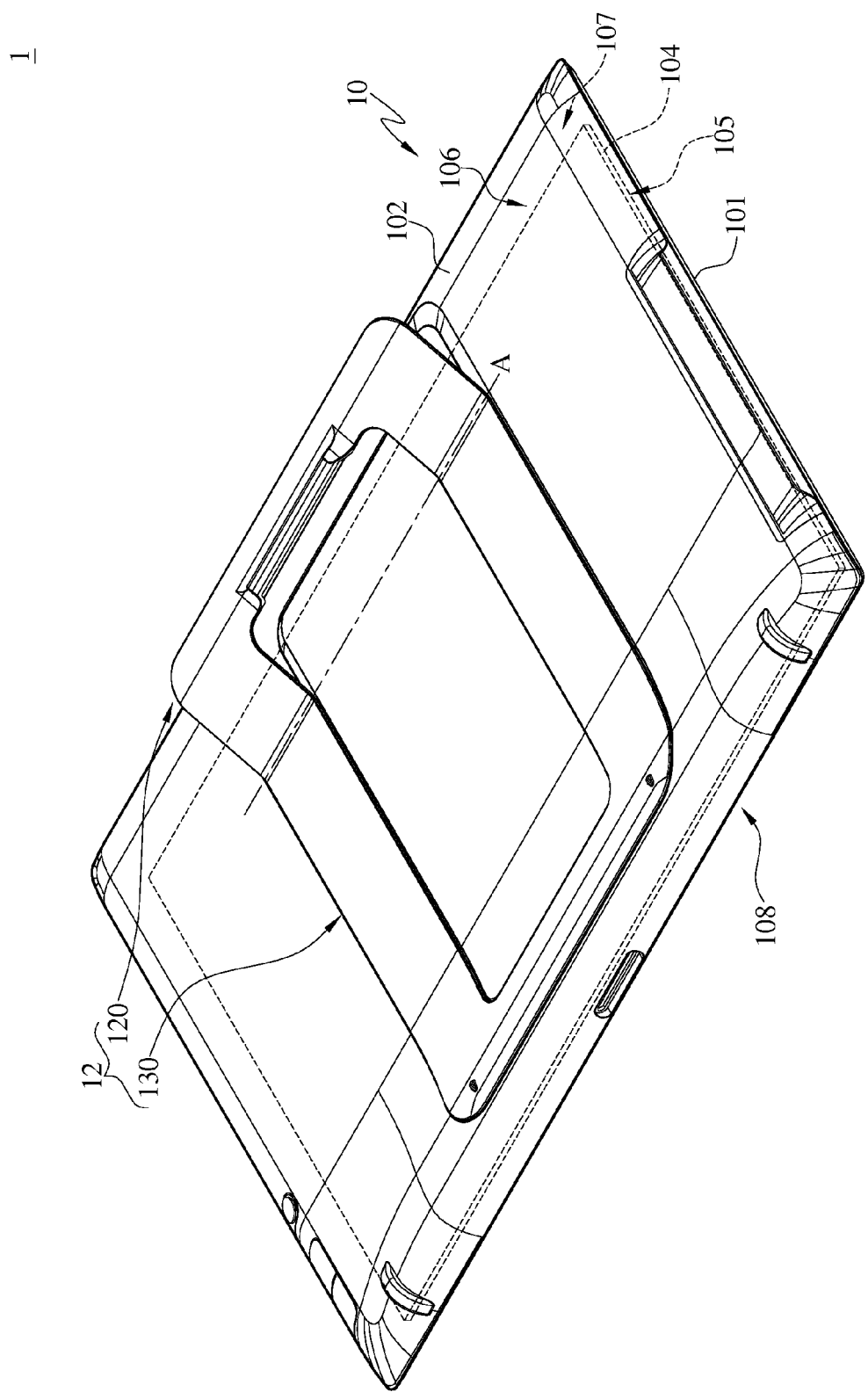
FIG. 7 is a perspective view of an electronic device according to a second embodiment of the disclosure.
Figure 8:
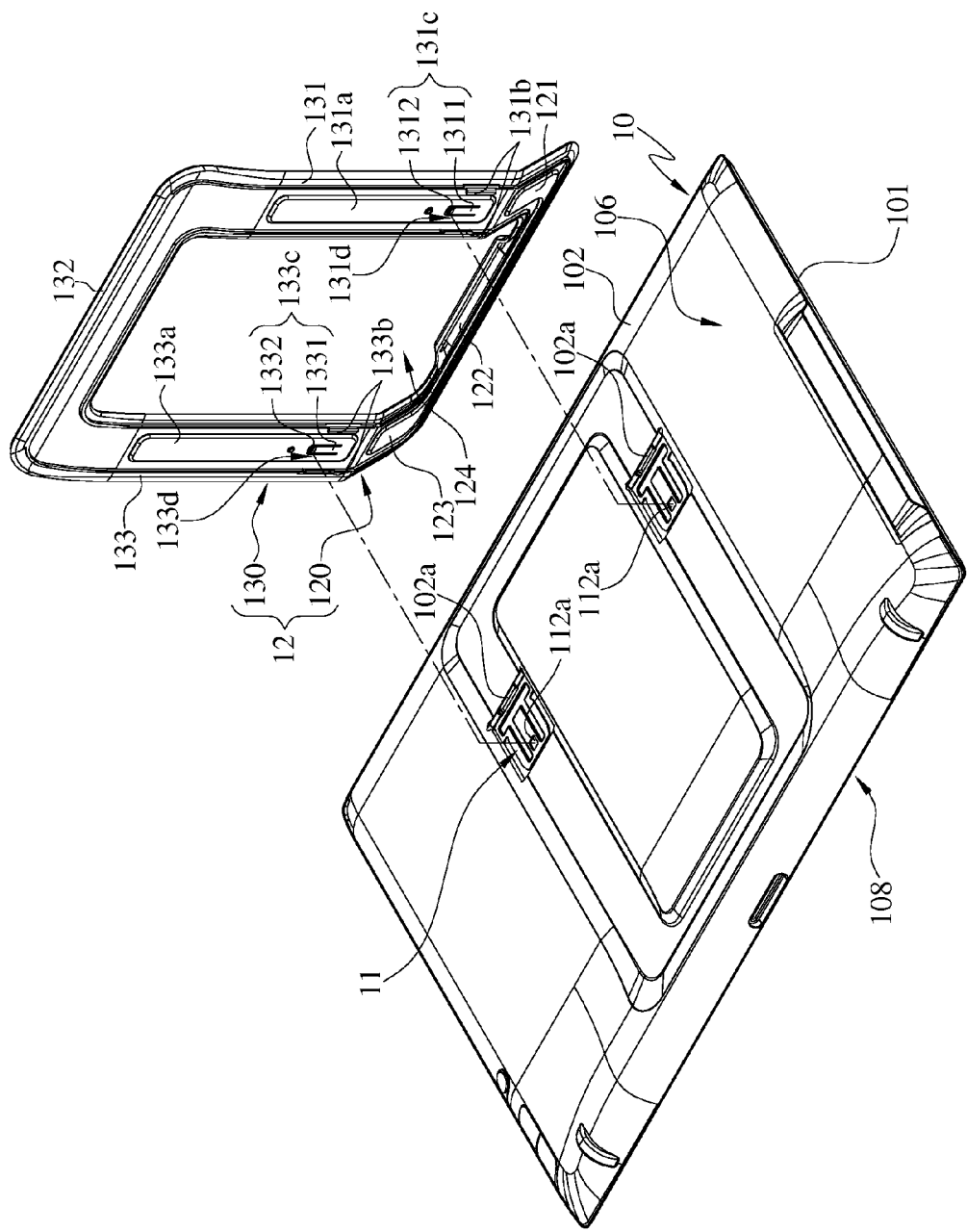
FIG. 8 is an exploded view of the electronic device according to the second embodiment of the disclosure.
Figure 9:
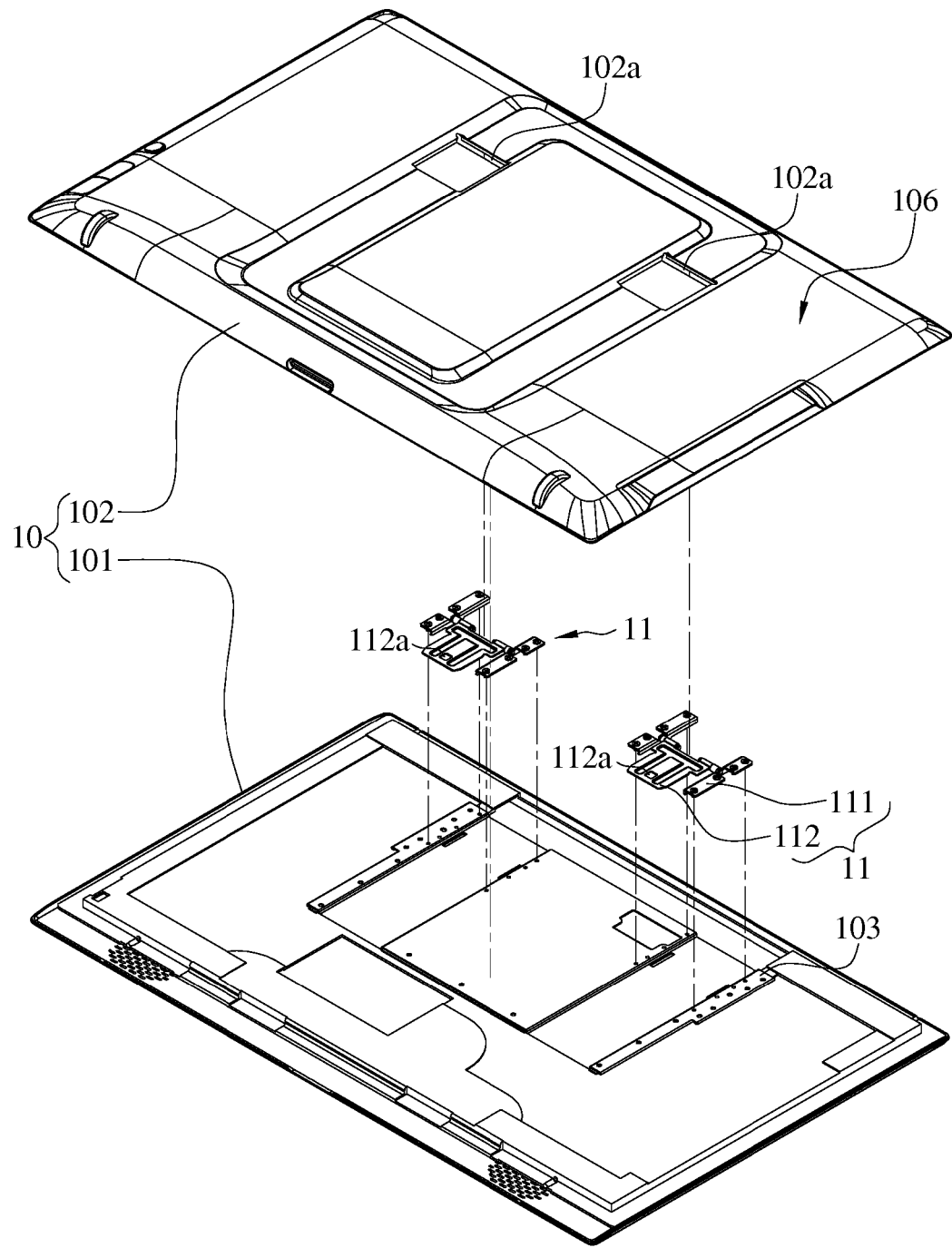
FIG. 9 is another exploded view of the electronic device according to the second embodiment of the disclosure.

Please refer to FIG. 7, FIG. 8 and FIG. 9. FIG. 7 is a perspective view of an electronic device according to a second embodiment of the disclosure. FIG. 8 is an exploded view of the electronic device according to the second embodiment of the disclosure. FIG. 9 is another exploded view of the electronic device according to the second embodiment of the disclosure. In this embodiment, an electronic device 1 comprises a display 10 and a stand for supporting the electronic device 10. The stand comprises two hinge assemblies 11 and a supporting assembly 12. Since the display 10 is similar to the display 30 mentioned in the first embodiment, the following only describes the differences between the display 10 and the display 30.

In this embodiment, a second case 102 of the display 10 has two through holes 102a. The through hole 102a extends through two sides of a rear surface 106 of the second case 102 to be connected to an accommodation space 107.

Each of the two hinge assemblies 11 comprises a fixing component 111 and an assembling component 112. Each of the two assembling components 112 has a positioning hole 112a. The fixing component 111 is installed on an assembling plate 103 of the display 10. The assembling component 112 is pivoted on the fixing component 111, and passes through the through hole 102a of the display 10 to be exposed from the rear surface 106 to the outside.

As shown in FIG. 8, the supporting assembly 12 comprises a holder 120 and a support 130 that are integrated together (i.e., integrated into a single piece). The holder 120 and the support 130 are integrated into an annular frame. The holder 120 comprises a first connecting section 121, a second connecting section 122 and a third connecting section 123. The first connecting section 121 and the third connecting section 123 are connected to two ends of the second connecting section 122 that are opposite to each other, respectively, so that the first connecting section 121, the second connecting section 122 and the third connecting section 123 together enclose to form a carrying opening 124.

The support 130 comprises a fourth connecting section 131, a fifth connecting section 132 and a sixth connecting section 133. The fourth connecting section 131 and the sixth connecting section 133 are connected to two ends of the fifth connecting section 132 that are opposite to each other, respectively. The fourth connecting section 131 is connected to the first connecting section 121 of the holder 120, and the sixth connecting section 133 is connected to the third connecting section 123 of the holder 120. Therefore, the holder 120 and the support 130 can be driven to rotate simultaneously.

Moreover, the fourth connecting section 131 comprises a main body 131a, two sliding rails 131b and an elastic sheet 131c. The two sliding rails 131b are disposed on the main body 131a. The two sliding rails 131b together form an inserting groove 131d. The elastic sheet 131c is located in the inserting groove 131d. The sixth connecting section 133 comprises a main body 133a, two sliding rails 133b and an elastic sheet 133c. The two sliding rails 133b are disposed on the main body 133a. The two sliding rails 133b together form an inserting groove 133d. The elastic sheet 133c is located in the inserting groove 133d. Moreover, in this embodiment, the elastic sheet 131c comprises a connecting portion 1311 and a fastening portion 1312, and the elastic sheet 133c comprises a connecting portion 1331 and a fastening portion 1332. The connecting portions 1311 and 1331 are disposed on the main bodies 131a and 133a, respectively. The fastening portions 1312 and 1332 extend from the main bodies 131a and 133a toward the inserting grooves 131d and 133d, respectively.

The two assembling components 11 of the two hinge assemblies 112 are inserted into the inserting groove 131d and 133d, respectively, so that the fastening portions 1312 and 1332 are detachably fastened to the two holes 112a, thereby fastening the supporting assembling 12 to the two assembling components 112. Furthermore, the fastening portions 1312 and 1332 can be separated from the two positioning holes 112a so as to detach the supporting assembling 12 from the assembling components 112.

Figure 10:
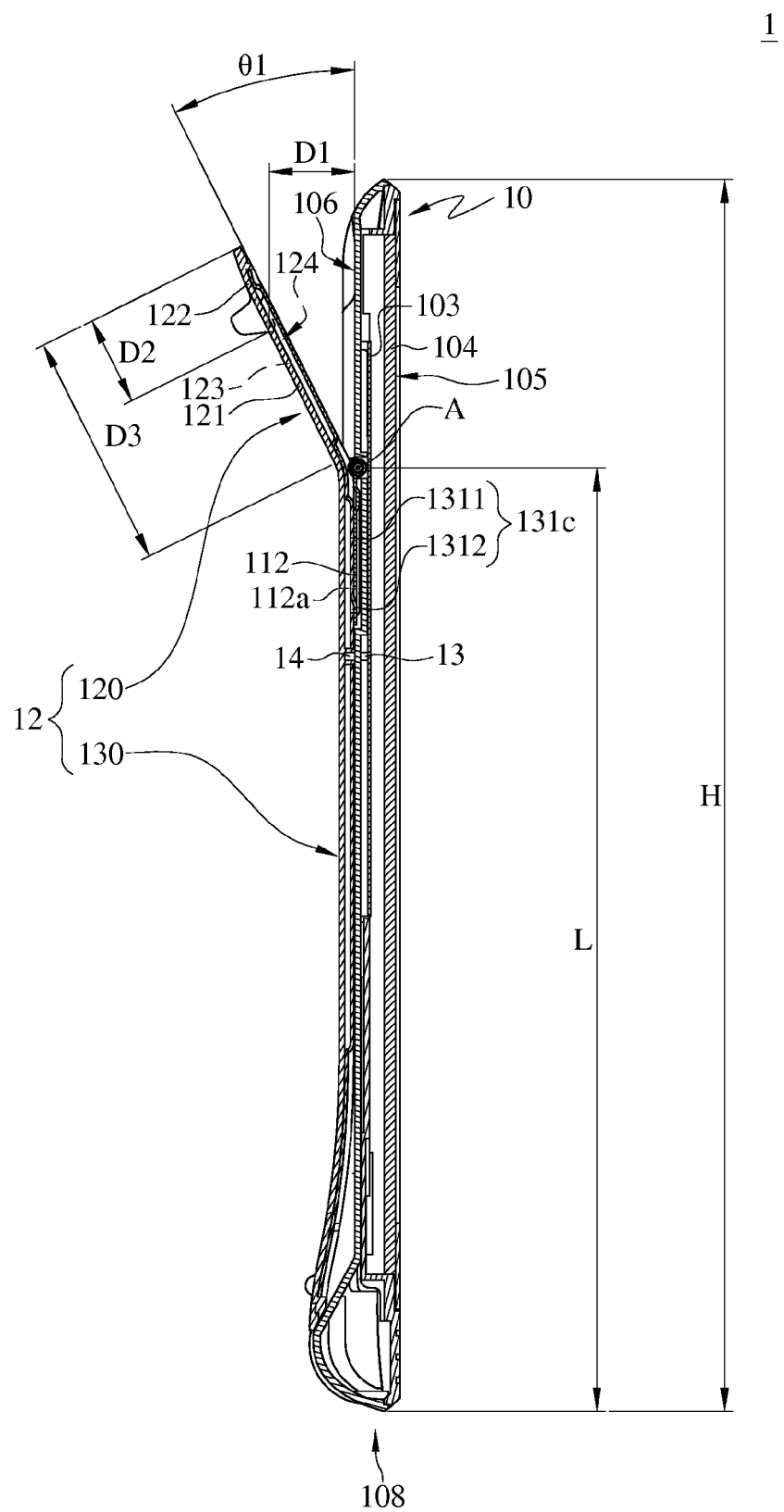
FIG. 10 is a side view of the electronic device with a holder located at a holding position according to the second embodiment of the disclosure.
Figure 11:
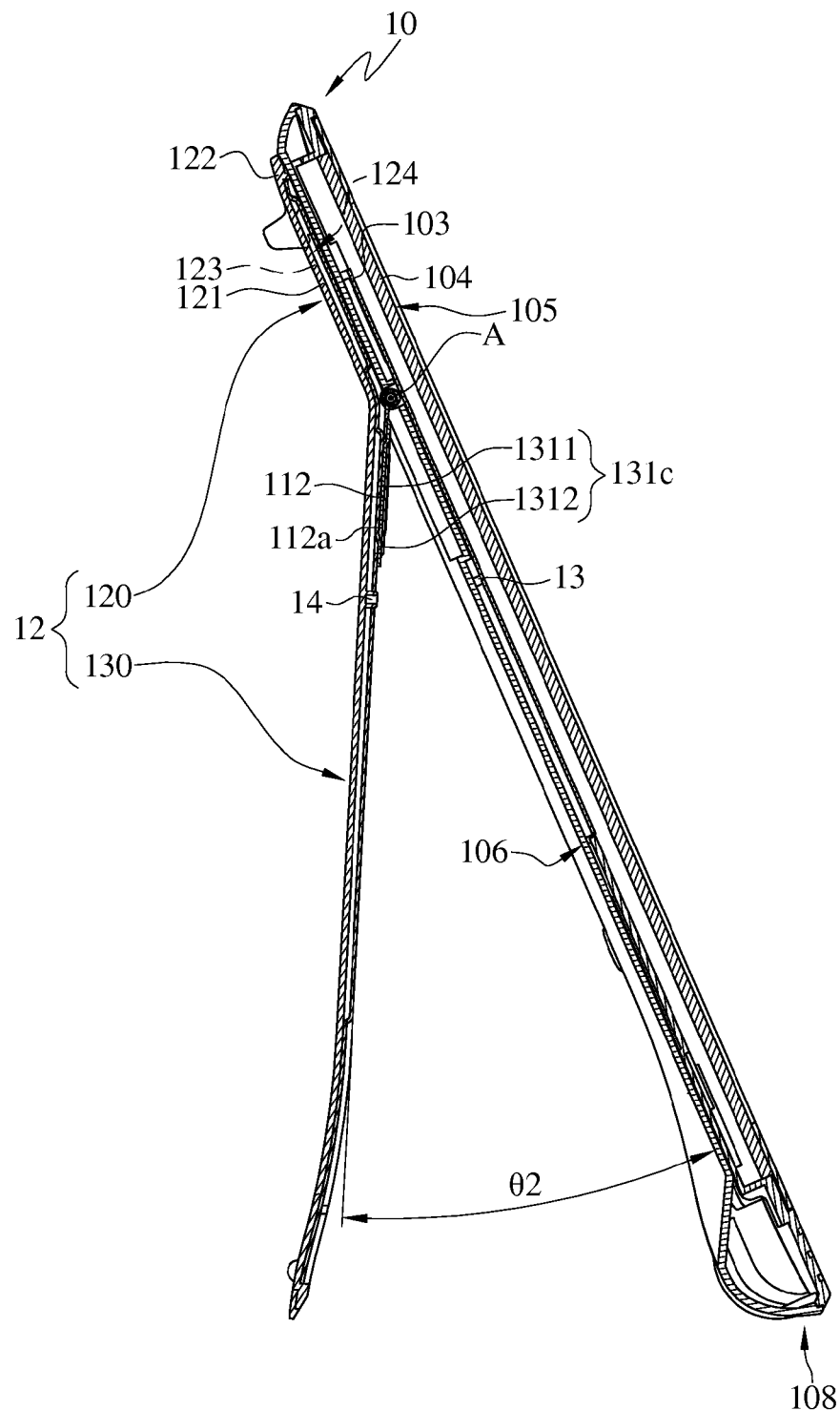
FIG. 11 is a side view of the electronic device with a support located at a supporting position according to the second embodiment of the disclosure.

When the supporting assembly 12 is installed on the assembling components 112, the assembling assembly 12 is for pivoting relative to the display 10. In this embodiment, the holder 120 is for pivoting relative to the display 10 to have a holding position (please refer to FIG. 10 in advance) and a leaning position (please refer to FIG. 11 in advance, which is a side view of the electronic device with a support located at a supporting position according to the second embodiment of the disclosure), and the support 130 is for pivoting relative to the display 10 to have a storing position (as shown in FIG. 10) and a supporting position (as shown in FIG. 11). The rear surface 106 and the holder 120 keep a first angle θ1 therebetween when the holder 120 is located at the holding position. The holder 120 leans against the rear surface 106 when located at the leaning position. When the holder 120 pivots from the holding position to the leaning position, the holder 120 drives the support 130 to pivot with each other so that the support 130 pivots from the storing position to the supporting position. The support 130 leans against the rear surface 106 when located at the storing position. The rear surface 106 and the support 130 keep a second angle θ2 therebetween when the support 130 is located at the supporting position.

Please refer to FIG. 10. FIG. 10 is a side view of the electronic device with a holder located at a holding position according to the second embodiment of the disclosure. In this embodiment, the display 10 has a bottom edge 108. When the electronic device 1 stands on a surface (not shown in the drawings) via the support 130, the bottom edge 108 leans against the surface. The surface is, for example, a top surface of a desk. The supporting assembly 12 is for pivoting relative to the display 10 along an axis A parallel to the bottom edge 108. There is a distance L between the axis A and the bottom edge 108 (in other words, there is a distance L between an axis of the rotation of the hinge assembly 11 and the bottom edge 108) so as to prevent the display 10 from collapsing. In this embodiment, the distance L is 0.5 times greater than a height H of the display 10, but is 0.75 times less than the height H (that is, 0.5H<L<0.75H). Therefore, the electronic device 1 can stably stand on the surface. The disclosure is not limited to the foregoing ratio of the distance L to the height H. In some other embodiments, the ratio of the distance L to the height H can be adjusted based on the weight of the display 10.

Furthermore, when the support 130 is located at the storing position, there is a distance D1 between an edge of the second connecting section 122 close to the support 130 and the rear surface 106, the second connecting section 122 has a width D2, both of the first connecting section 121 and the third connecting section 123 have a length D3, the holder 120 and the rear surface 106 keep the first angle θ1 therebetween, and the following condition is satisfied: cot θ1=D1/(D3−D2). Therefore, the user is able to favorably insert his/her hand through the carrying opening 124 to carry the electronic device 1. In this embodiment, the distance D1 is larger than 18 cm, the width D2 is larger than 20 cm, and the length D3 is larger than 60 cm, but the disclosure is not limited thereto. In some other embodiments, the distance D1, the width D2 and the length D3 can be any value, respectively, without taking into account the operation and movement of the electronic device 1.

Furthermore, the electronic device 1 further comprises a first magnetic component 13 and a second magnetic component 14. The first magnetic component 13 is located at the rear surface 106 of the display 10, and the second magnetic component 14 is located at the support 130. The first magnetic component 13 and the second magnetic component 14 are for attracting to each other.

Please refer to FIG. 10 and FIG. 11. As shown in FIG. 10, the first magnetic component 13 attracts the second magnetic component 14 so as to locate the support 130 and the holder 120 at the storing position and the holding position, respectively. The user can carry the electronic device 1 by directly inserting his/her hand through the carrying opening 124 to hold the holder 120.

When the user needs to stand the electronic device on the surface, the user presses the display 10 and the holder 120 simultaneously with one hand (for example, a thumb and a forefinger). When a force applied to press the display 10 and the holder 120 is greater than the attraction between the first magnetic component 13 and the second magnetic component 14, the holder 120 pivots relative to the display 10 from the holding position to the leaning position. The holder 120 drives the support 130 to pivot from the storing position to the supporting position (as shown in FIG. 11). Therefore, the electronic device 1 can stand on the surface of the desk via the support 130.

To sum up, the user carries the electronic device 1, rotating the support 130, standing the electronic device 1 on the supporting surface with only one hand. Therefore, it is favorable for operating the electronic device 1 more conveniently.

Furthermore, when the two assembling components 112 are inserted into the inserting grooves 131d and 133d, respectively, the first case 101 and the supporting assembly 12 interpose the second case 102 so as to allow the first case 101 and the second case 102 to tightly assemble with each other.

Figure 12:
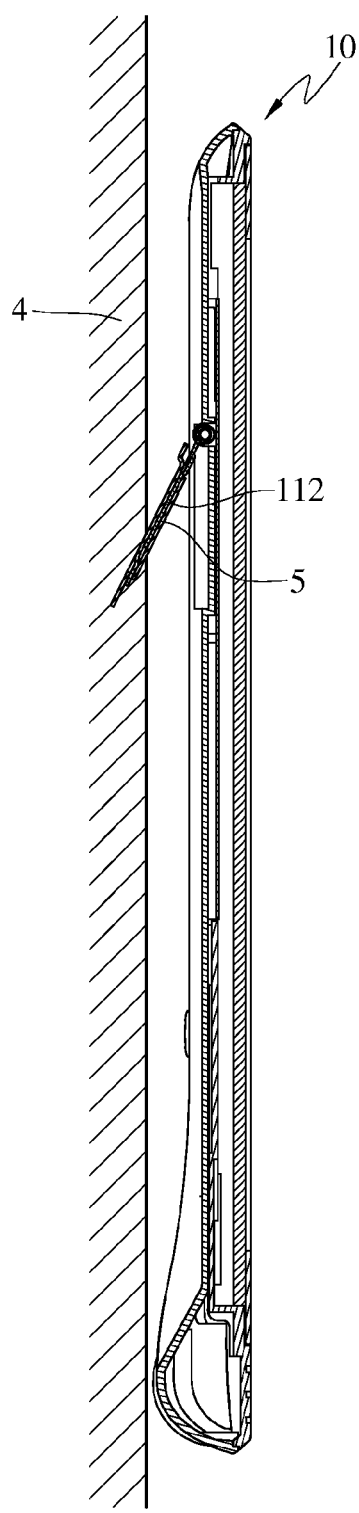
FIG. 12 is a side view of the electronic device disposed on a wall according to the second embodiment of the disclosure.

Moreover, in this embodiment, the electronic device 1 can be hung on a wall 4 instead of standing on the surface of a desk. Please refer to FIG. 12, which is a side view of the electronic device disposed on a wall according to the second embodiment of the disclosure. When the electronic device 1 stands on the surface, a field of view of the electronic device 1 is limited (referring to FIG. 11). Therefore, as shown in FIG. 112, to watch programs, shows or look at images by the display 10 more comfortably, the user presses the elastic sheet 131c and 133c to separate the display 10 from the supporting assembly 12. A rack 5 is installed on the wall 4, and has two grooves corresponding to the two assembling components 112. The two assembling components 112 are inserted into the rack 5 so as to install the display 10 on the wall 4.

Figure 13:
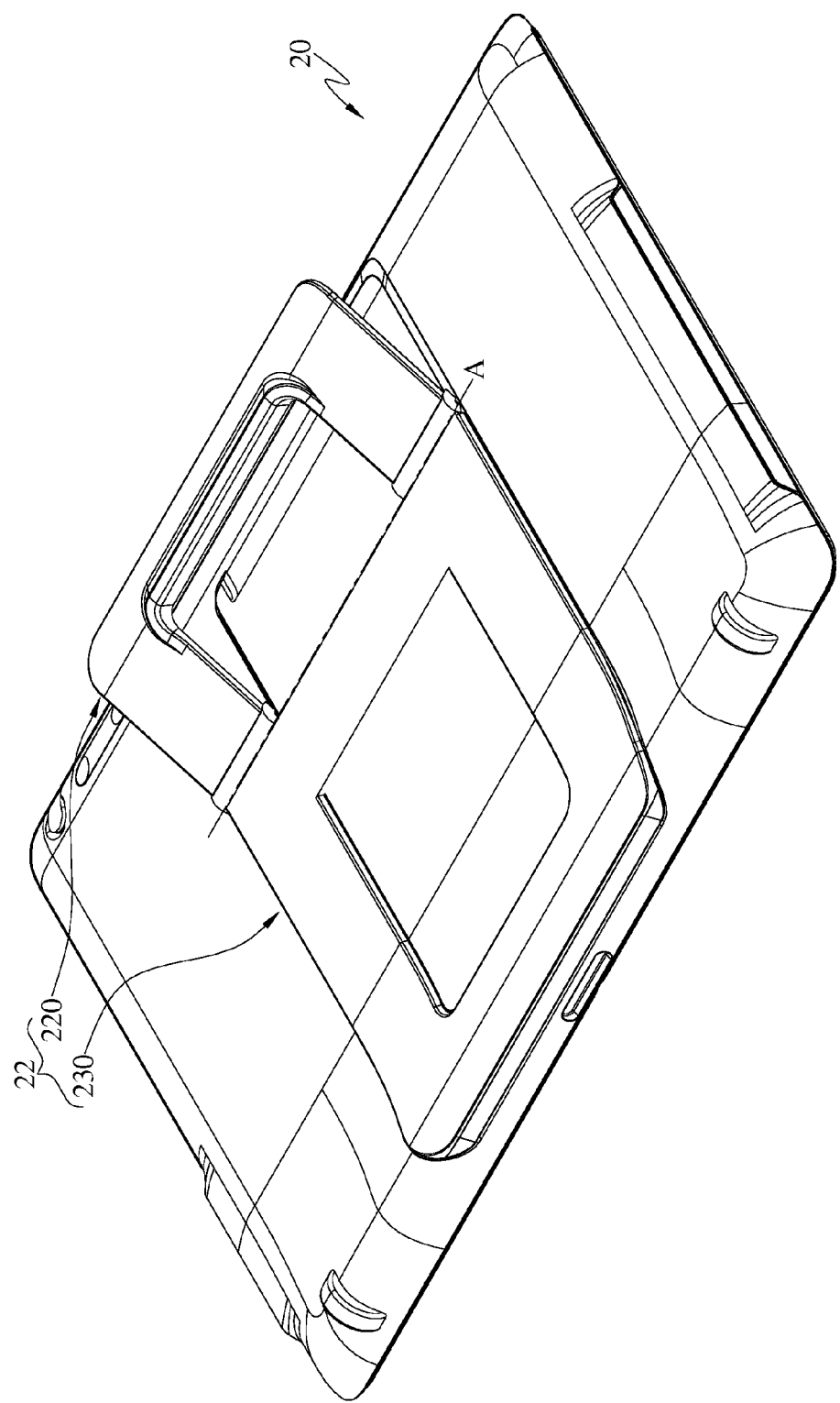
FIG. 13 is a perspective view of an electronic device according to a third embodiment.
Figure 14A:
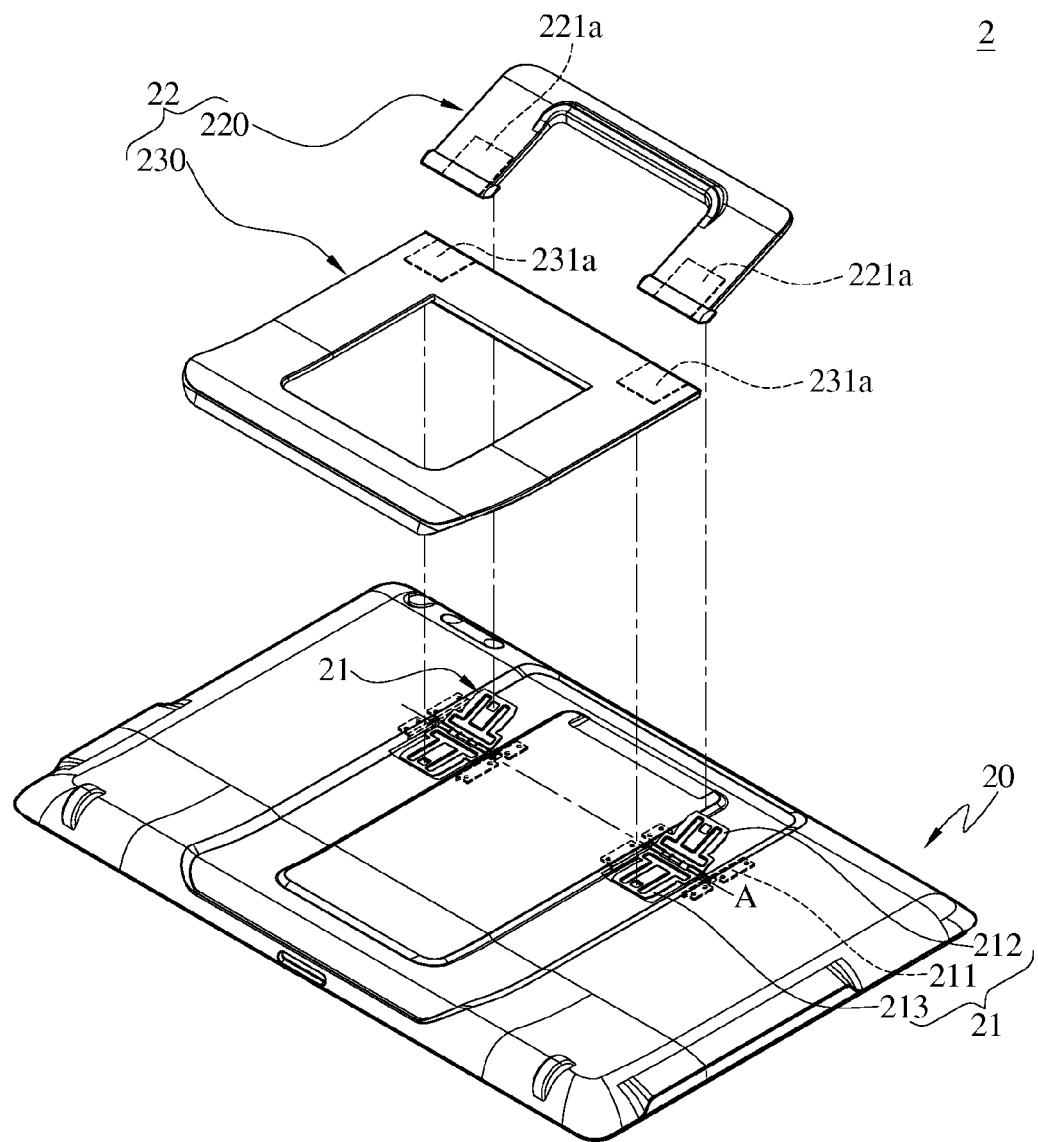
FIG. 14A is an exploded view of the electronic device according to the third embodiment.
Figure 14B:
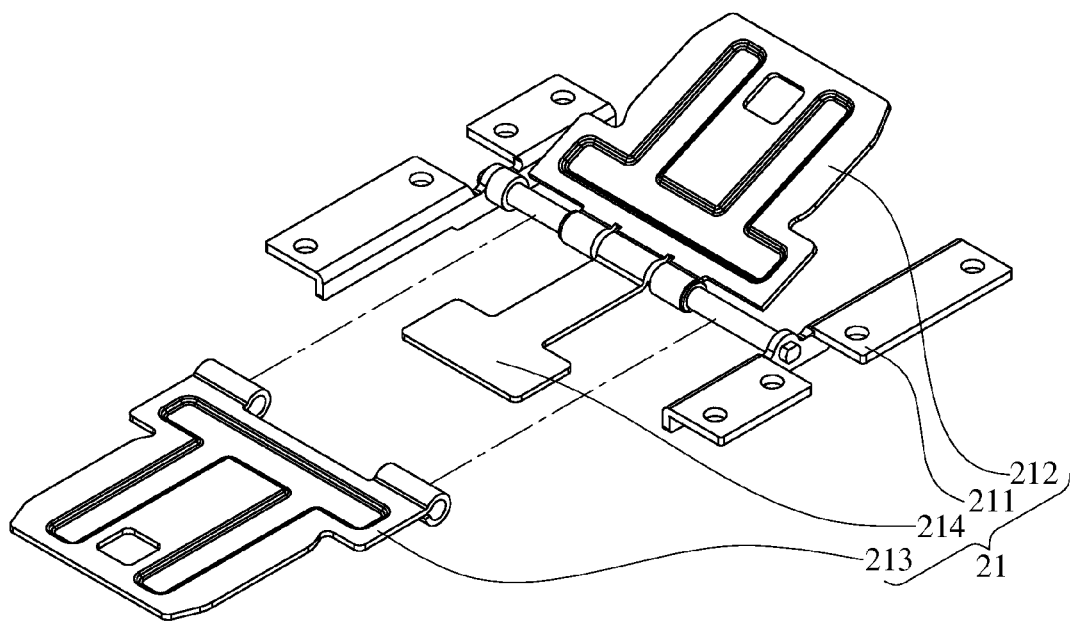
FIG. 14B is an enlarged view of a hinge assembly in FIG. 14A.

The holder and the support of the supporting assembly can be two individual units. Please refer to FIG. 13, FIG. 14A and FIG. 14B. FIG. 13 is a perspective view of an electronic device according to a third embodiment. FIG. 14A is an exploded view of the electronic device according to the third embodiment. FIG. 14B is an enlarged view of a hinge assembly in FIG. 14A. Since this embodiment is similar to the second embodiment, the following only describes the differences. In this embodiment, an electronic device 2 comprises a display 20, two hinge assemblies 21 and a supporting assembly 22. Each of the two hinge assemblies 21 comprises a fixing component 211, a first assembling component 212, a second assembling component 213 and a blocking component 214. The fixing component 211 is installed on the display 20. Both of the first assembling component 212 and the second assembling component 213 are pivoted on the fixing component 211. The first assembling component 212 and the second assembling component 213 are for pivoting relative to the display 10 along an axis A. The blocking component 214 is securely fixed to the first assembling component 212. The supporting assembly 22 comprises a holder 220 and a support 230 that are two individual units (that is, being not integrated into a single unit). The holder 220 has two first inserting grooves 221a, and the support 230 has two second inserting grooves 231a. The first assembling component 212 and the second assembling component 213 are inserted into the first inserting groove 221a and the second inserting groove 231a, respectively, so that the blocking component 214 is located between the display 20 and the support 230. When the holder 220 pivots relative to the display 20 from a holding position to a leaning position, the first assembling component 212 drives the blocking component 214 to rotate with each other. The blocking component 214 presses the second assembling component 213 so as to drive the support 230 to pivot relative to the holder 220 from a storing position to a supporting position.

Figure 15:
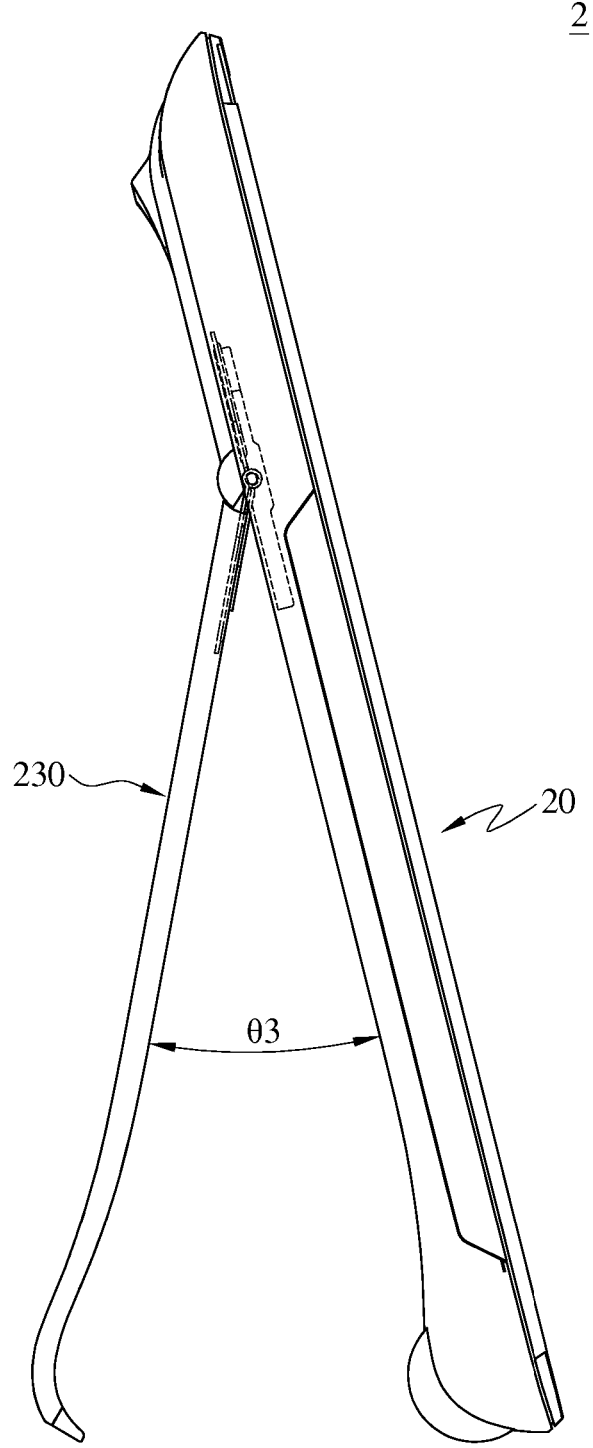
FIG. 15 is a side view of the electronic device with a support located at a supporting position according to the third embodiment of the disclosure.
Figure 16:
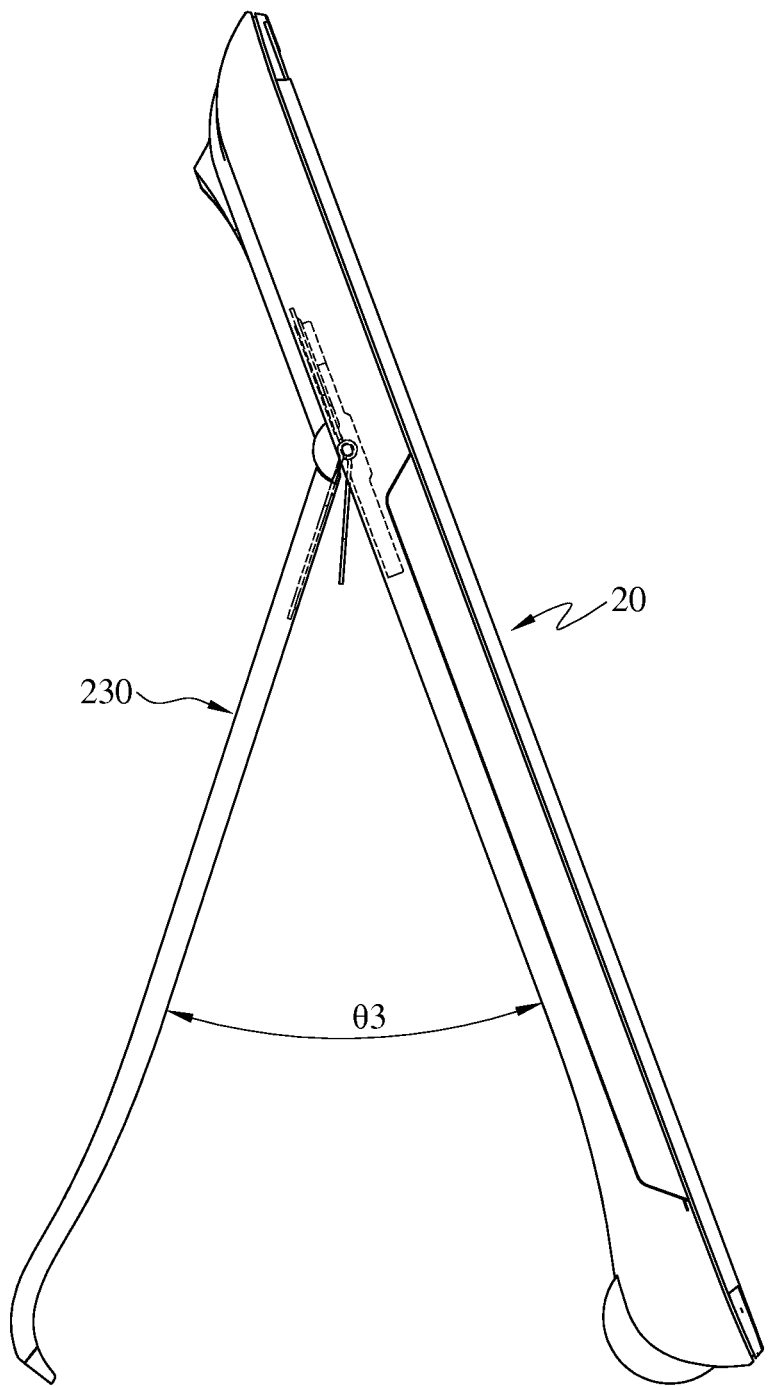
FIG. 16 is a side view of pressing the electronic device in FIG. 15.

Please refer to FIG. 15 and FIG. 16. FIG. 15 is a side view of the electronic device with a support located at a supporting position according to the third embodiment of the disclosure. FIG. 16 is a side view of pressing the electronic device in FIG. 15. In this embodiment, when the electronic device 2 stands on a supporting surface via the support 230, the support 230 and the display 20 keep an angle θ3 therebetween (as shown in FIG. 15). The user presses the display 20 to increase the angle θ3 (as shown in FIG. 16) so that it is favorable for adjusting an angle of slope of the display 20 under different usage conditions.

To sum up, in the second embodiment, the hinge assembly 11 comprises only one assembling component 112, and the holder 120 and the support 130 are integrated into a single unit (as shown in FIG. 7). Therefore, the angle between the support 130 and the display 10 is fixed. However, in this embodiment, the hinge assembly 21 comprises the first assembling component 530 and the second assembling component 550 that are for rotating independently, and the holder 220 and the support 230 are two separated and individual units (as shown in FIG. 13 and FIG. 14A). Therefore, the angle between the support 230 and the display 20 is adjustable.

Figure 17:
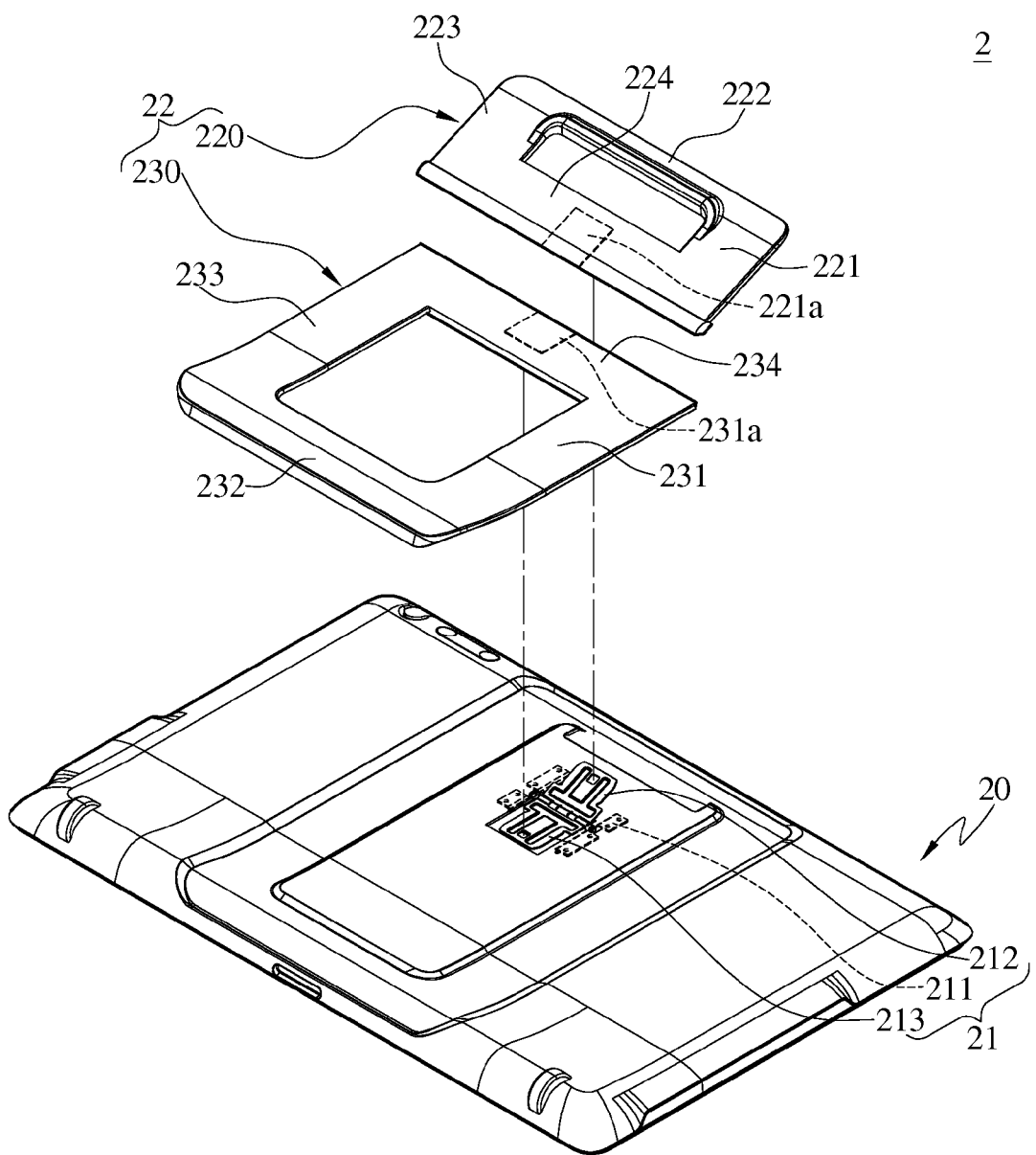
FIG. 17 is an exploded view of an electronic device according to the fourth embodiment.

The number of assembling components, that of the inserting groove and that of the blocking component can only be one. Please refer to FIG. 17. FIG. 17 is an exploded view of an electronic device according to the fourth embodiment. Since this embodiment is similar to the third embodiment, the following only describes the differences. In this embodiment, the hinge assembly 21 comprises only one first assembling component 212, only one second assembling component 213 and only one blocking component 214. The holder 220 has only one first inserting groove 221a, and the support 230 has only one second inserting groove 231a. The holder 220 further comprises a seventh connecting section 224. Two ends of the seventh connecting section 224 that are opposite to each other are connected to the first connecting section 221 and the third connecting section 223, respectively. The support 230 further comprises an eighth connecting section 234. Two ends of the eighth connecting section 234 that are opposite to each other are connected to the fourth connecting section 231 and the sixth connecting section 233, respectively. Both of the seventh connecting section 224 and the eighth connecting section 234 are located between the second connecting section 222 and the fifth connecting section 232. The first inserting groove 221a and the second inserting groove 231a are located at the seventh connecting section 224 and the eighth connecting section 234, respectively.

According to the disclosure, the supporting assembly comprises the holder and the support that are for rotating with each other. Therefore, when the user presses the holder to drive the holder to pivot relative to the display, the holder drives the support to rotate with each other so that the support pivots relative to the display from the storing position to the supporting position. Furthermore, the user is able to carry the electronic device and stand the electronic device on the supporting surface with only one hand so that it is favorable for operating the electronic device more conveniently.

Moreover, when the assembling component is inserted into the inserting groove, the first case and the supporting assembly interpose the second case so as to allow the first case and the second case to tightly assemble with each other.

What is claimed is:

1. An electronic device, comprising:
   a display having a rear surface;
   at least one hinge assembly comprising a fixing component and at least one assembling component, the fixing component disposed on the display, and the at least one assembling component pivoted on the fixing component; and a supporting assembly disposed on the assembling component for pivoting relative to the display, the supporting assembly comprising a holder and a support that are for moving relative to each other, the support comprising at least two sliding rails, the two sliding rails forming at least one first inserting groove, the assembling component being slidably inserted into the first inserting groove so that the supporting assembly is detachably installed on the assembling component, the holder being for pivoting relative to the display to have a holding position and a leaning position, the support being for pivoting relative to the display to have a storing position and a supporting position, the holder being for pivoting from the holding position to the leaning position so as to drive the support to pivot with the holder from the storing position to the supporting position;

wherein, the rear surface of the display and the holder keep a first angle when the holder is located at the holding position, the holder leans against the rear surface when the holder is located at the leaning position; and wherein, the support leans against the rear surface when the support is located at the storing position, the rear surface and the support keep a second angle when the support is located at the supporting position.

2. The electronic device according to claim 1, wherein the display comprises a first case, a second case and an assembling plate, the second case is installed on the first case to form an accommodation space together, the rear surface is located at a side of the second case facing away from the first case, the second case has a through hole extending through two sides of the second case to be connected to the accommodation space, the assembling plate is installed in the accommodation space, the fixing component is installed on the assembling plate, and the at least one assembling component passes through the through hole to be exposed to the outside.

3. The electronic device according to claim 1, wherein the display has a bottom edge, the at least one assembling component is for rotating relative to the fixing component around an axis, a distance between the axis and the bottom edge is 0.5 times greater than a height of the display, and the distance between the axis and the bottom edge is 0.75 times less than the height of the display.

4. The electronic device according to claim 1, wherein the holder and the support are integrated together, both of the holder and the support are annular frames.

5. The electronic device according to claim 4, wherein the at least one assembling component has a positioning hole, the support further comprises an elastic sheet, the elastic sheet is detachably fastened to the positioning hole.

6. The electronic device according to claim 1, wherein the holder and the support are integrated together, the holder comprises a first connecting section, a second connecting section and a third connecting section, the first connecting section and the third connecting section are connected to two ends of the second connecting section that are opposite to each other, respectively, the support comprises a fourth connecting section, a fifth connecting section and a sixth connecting section, the fourth connecting section and the sixth connecting section are connected to two ends of the fifth connecting section that are opposite to each other, respectively, the fourth connecting section is connected to the first connecting section, the sixth connecting section is connected to the third connecting section, the number of the at least one first inserting groove is two, the fourth connecting section and the sixth connecting section respectively have the two first inserting grooves, the number of the at least one assembling component is two, the two assembling components are installed in the two first inserting grooves, respectively.

7. The electronic device according to claim 6, wherein each of the two assembling components has a positioning hole, both of the fourth connecting section and the sixth connecting section comprise an elastic sheet, the two elastic sheets is detachably fastened to the two positioning holes, respectively.

8. The electronic device according to claim 6, wherein when the support is located at the storing position, there is a distance D1 between an edge of the second connecting section close to the support and the rear surface, the second connecting section has a width D2, both of the first connecting section and the third connecting section have a length D3, the holder and the rear surface keep an angle 9, and the following condition is satisfied:

cot θ=D1/(D3−D2), wherein the distance D1 is larger than 18 cm, the width D2 is larger than 20 cm, and the length D3 is larger than 60 cm.

9. The electronic device according to claim 1, wherein the holder and the support are two individual units, the holder has a second inserting groove the at least one assembling component comprises a first assembling component and a second assembling component, both of the first assembling component and the second assembling component are for rotating relative to the fixing component around an axis, the first assembling component and the second assembling component are inserted into the second inserting groove of the holder and the first inserting groove of the support, respectively, so that the support is for rotating relative to the holder.

10. The electronic device according to claim 9, wherein the hinge assembly further comprises a blocking component, the blocking component is securely fastened to the first assembling component, the blocking component is located between the support and the display, and when the holder pivots relative to the display, the blocking component presses the support so as to drive the support to leave from the storing position.

11. The electronic device according to claim 1, further comprising a first magnetic component and a second magnetic component, the first magnetic component is located at the rear surface of the display, the second magnetic component is located at the support, the first magnetic component is for detachably attracting the second magnetic component so as to position the support at the storing position.

12. An electronic device, comprising:

a display having a rear surface;

at least one hinge assembly comprising a fixing component and at least one assembling component, the fixing component disposed on the display, and the at least one assembling component pivoted on the fixing component; and a supporting assembly disposed on the assembling component for pivoting relative to the display, the supporting assembly comprising a holder and a support that are for moving relative to each other, the holder being for pivoting relative to the display to have a holding position and a leaning position, the support being for pivoting relative to the display to have a storing position and a supporting position, the holder being for pivoting from the holding position to the leaning position so as to drive the support to pivot with the holder from the storing position to the supporting position;

wherein, the rear surface of the display and the holder keep a first angle when the holder is located at the holding position, the holder leans against the rear surface when the holder is located at the leaning position; and wherein, the support leans against the rear surface when the support is located at the storing position, the rear surface and the support keep a second angle when the support is located at the supporting position;

wherein the hinge assembly further comprises a pivotal shaft, a link-up component, a fastening component, a first elastic component and a second elastic component, the at least one assembling component comprises a first assembling component and a second assembling component, the pivotal shaft comprises a first pivotal section, a second pivotal section and a limiting section, the first pivotal section and the second pivotal section are connected to two sides of the limiting section that are opposite to each other, respectively, the fixing component is securely fixed to the first pivotal section, all of the first assembling component, the link-up component and the second assembling component are pivoted on the second pivotal section, the link-up component is located between the first assembling component and the second assembling component, the first assembling component drives the second assembling component to move with each other via the link-up component, the fastening component is securely fastened to the second pivotal section, the second assembling component is located between the fastening component and the link-up component, the first elastic component surrounds the first pivotal section, two ends of the first elastic component that are opposite to each other are fastened to the fixing component and the first assembling component, respectively, the second elastic component surrounds the second pivotal section, and two ends of the second elastic component that are opposite to each other are fastened to the fastening component and the second assembling component, respectively.

13. The electronic device according to claim 12, wherein the limiting section has a first limiting notch, the link-up component has a second limiting notch, the first assembling component has a first protrusion and a second protrusion, the first protrusion is slidably disposed in the first limiting notch, and the second protrusion is slidably disposed in the second limiting notch.

14. The electronic device according to claim 13, wherein the link-up component has a hook, the second assembling component has a slot, the hook is fastened to the slot so that the link-up component is for driving the second assembling component to move with each other.

15. The electronic device according to claim 14, further comprising a plurality of elastic rings, a first locking component and a second locking component, the elastic rings surround the second pivotal section, the first locking component is screwed to the second pivotal section so as to interpose the first assembling component, the link-up component, the second assembling component and the elastic rings between the limiting section and the first locking component, and the second locking component is screwed to the second pivotal section so as to interpose the second elastic component and the fastening component between the first locking component and the second locking component.

16. The electronic device according to claim 12, wherein both of the first elastic component and the second elastic component are torsion springs, a torque for driving the second elastic component is greater than the torque for driving the first elastic component.

17. A stand, comprising:
a supporting assembly comprising a holder and a support that are for moving relative to each other; and
a hinge assembly, comprising:
a pivotal shaft comprising a first pivotal section, a second pivotal section and a limiting section, the first pivotal section and the second pivotal section connected to two surfaces of the limiting section that are opposite to each other, respectively;
a fixing component securely fixed to the first pivotal section for being assembled to an electronic device, the electronic device comprising a display;
a first assembling component pivoted on the second pivotal section, and the first assembling component assembled to the holder;
a second assembling component pivoted on the second pivotal section, and the second assembling component assembled to the support;
a link-up component pivoted on the second pivotal section, the link-up component located between the first assembling component and the second assembling component;
a fastening component fastened to the second pivotal section, the second assembling component located between the fastening component and the link-up component;
a first elastic component surrounding the first pivotal section, two ends of the first elastic component that are opposite to each other are fastened to the fixing component and the first assembling component, respectively; and
a second elastic component surrounding the second pivotal section, two ends of the second elastic component opposite to each other are fastened to the fastening component and the second assembling component, respectively.

18. The stand according to claim 17, wherein the limiting section has a first limiting notch, the link-up component has a second limiting notch, the first assembling component has a first protrusion and a second protrusion, the first protrusion is slidably disposed in the first limiting notch, and the second protrusion is slidably disposed in the second limiting notch.

19. The stand according to claim 17, wherein the link-up component has a hook, the second assembling component has a slot, the hook is fastening to the slot so that the link-up component is for driving the second assembling component to move with each other.

20. The stand according to claim 17, further comprising a plurality of elastic rings, a first locking component and a second locking component, the elastic rings surround the second pivotal section, the first locking component is screwed to the second pivotal section so as to interpose the first assembling component, the link-up component, the second assembling component and the elastic rings between the limiting section and the first locking component, and the second locking component is screwed to the second pivotal section so as to interpose the second elastic component and the fastening component between the first locking component and the second locking component.

21. The stand according to claim 17, wherein both of the first elastic component and the second elastic component are torsion springs, a torque for driving the second elastic component is greater than the torque for driving the first elastic component.

\* \* \* \* \*